(12) United States Patent
Roberts

(10) Patent No.: US 10,996,818 B2
(45) Date of Patent: May 4, 2021

(54) METHOD AND SYSTEM FOR FACILITATING MANAGEMENT OF LISTS

(71) Applicant: Anthony Roberts, London (GB)

(72) Inventor: Anthony Roberts, London (GB)

(73) Assignee: Anthony Roberts, San Francisco, CA (US)

( * ) Notice: Subject to any disclaimer, the term of this patent is extended or adjusted under 35 U.S.C. 154(b) by 0 days.

(21) Appl. No.: 16/160,348

(22) Filed: Oct. 15, 2018

(65) Prior Publication Data

US 2019/0114040 A1    Apr. 18, 2019

Related U.S. Application Data

(60) Provisional application No. 62/572,323, filed on Oct. 13, 2017.

(51) Int. Cl.
*G06F 3/0482* (2013.01)
*G06F 3/0484* (2013.01)
*G06F 16/951* (2019.01)
*G06F 16/9532* (2019.01)

(52) U.S. Cl.
CPC ........ *G06F 3/0482* (2013.01); *G06F 3/04847* (2013.01); *G06F 16/951* (2019.01); *G06F 16/9532* (2019.01)

(58) Field of Classification Search
CPC ..... G06F 3/0482; G06F 3/0484–04847; G06F 3/0487–04886; G06F 16/242–243; G06F 16/437–4393; G06F 16/632–639
See application file for complete search history.

(56) References Cited

U.S. PATENT DOCUMENTS

| | | | | |
|---|---|---|---|---|
| 7,216,292 B1* | 5/2007 | Snapper | ................ | G06F 17/243 715/234 |
| 7,640,343 B2* | 12/2009 | Scott, III | ................ | G06F 16/44 709/226 |
| 7,756,753 B1* | 7/2010 | McFarland | ........ | G06Q 30/0631 705/26.1 |
| 9,355,173 B1* | 5/2016 | Salyers | ................... | G06F 16/38 |
| 9,699,490 B1* | 7/2017 | Japp | ..................... | H04N 21/251 |
| 9,946,790 B1* | 4/2018 | Siegel | ................... | G06F 16/355 |
| 2004/0254928 A1* | 12/2004 | Vronay | ................ | G06F 16/243 |
| 2006/0248078 A1* | 11/2006 | Gross | .................. | G06F 16/3322 |
| 2007/0050709 A1* | 3/2007 | Inose | .................... | G06F 3/0237 715/210 |
| 2007/0282811 A1* | 12/2007 | Musgrove | ........... | G06F 16/2423 |
| 2008/0288494 A1* | 11/2008 | Brogger | ................. | G06Q 30/02 |

(Continued)

*Primary Examiner* — Arpan P. Savla
*Assistant Examiner* — Linda Huynh

(57) ABSTRACT

A method of facilitating management of lists is disclosed. The method may include transmitting, using a communication device, an interface to a user device. Further, the interface may be configured for facilitating creation of a list title. Further, the method may include receiving, using the communication device, a plurality of selections corresponding to the interface from the user device. Further, the method may include generating, using a processing device, the list title based on the plurality of selections. Further, the method may include storing, using a storage device, the list title in association with a user identifier associated with the user device and an indication of a list of items associated with the list title. Further, the method may include transmitting, using the communication device, the list title to the user device.

4 Claims, 33 Drawing Sheets

(56) References Cited

U.S. PATENT DOCUMENTS

| | | | |
|---|---|---|---|
| 2009/0043737 A1* | 2/2009 | Faris | G06F 17/30864 |
| 2011/0288930 A1* | 11/2011 | Round | G06Q 30/0246 |
| | | | 705/14.45 |
| 2012/0016678 A1* | 1/2012 | Gruber | G06F 3/167 |
| | | | 704/275 |
| 2013/0041878 A1* | 2/2013 | Satyanarayana | ............. |
| | | | G06F 16/90324 |
| | | | 707/706 |
| 2016/0364483 A1* | 12/2016 | Orozco | G06F 16/3331 |
| 2017/0041261 A1* | 2/2017 | Richter | H04L 51/08 |
| 2018/0046703 A1* | 2/2018 | Lavie | G06F 16/355 |

* cited by examiner listmaker

Q Search for a list  ≡ Categories  ⊙ Anthony  [+ Create a list]

🎬 Movies and TV

The best movies ever made

| ⊕ Everyone's List 2002 | ⊙ Your list 2004 | ⊙ Elliot 2006 and 11 others | 2008 Share it \| f 🐦 |
|---|---|---|---|
| Pulp Fiction (1994) 8 Pam | 13 Daniel | 21 Chris | 6 Martin  On you list 13 |
| Mistaken (1994) 8 Pam | 7 Michael | 13 Christopher | 3 Rone |
| Matrix (2002) 8 Pam | 1 Max | 21 Rone | 6 Martin  On you list 1 |

| listmaker | 🔍 Search for a list | ≡ Categories | 👤 Anthony | ⊕ Create a list |

🎬 Movies and TV

The best movies ever made

| 🌐 Everyone's List *2002* | 👤 Your list *2004* | 👤 Elliot *2006* and 11 others | | Share it \| 🐦 f |

*2102*

A list by Elliot                                    👥 View others ›  *2104*

| 1 | ☐ Goal! The dream begins (2005) | On you list 13  ⊕ |
| 2 | ☐ Kingsman: The secret service (2015) | ⊕ |
| 3 | ☐ Mistaken (1994) | |

FIG. 23 listmaker | Search for a list | ≡ Categories | 👤 Anthony | ⊕ Create a list

🎬 Movies and TV

The best movies ever made

Everyone's List 2002 | Your list 2004 | Chris 2006 and 13 others | Share it | f 🐦

2302

A list by Chris | 👥 View others ⌄

① Lawrence of Arabia (2012) — On you list 16

② The Shining (1980) — ⊕

③ Space Odyssey (1968) — On you list 8

METHOD AND SYSTEM FOR FACILITATING MANAGEMENT OF LISTS

The current application claims a priority to the U.S. Provisional Patent application Ser. No. 62/572,323 filed on Oct. 13, 2017. The current application is filed on Oct. 15, 2018 while Oct. 13, 2018 was on a weekend.

FIELD OF THE INVENTION

The present invention relates generally to data processing. More specifically, the present disclosure relates to platforms, methods and systems of facilitating management of lists.

BACKGROUND OF THE INVENTION

In today's world, millions of users use the Internet as a medium to share their knowledge with the world. Accordingly, users post information in the form of text, video, audio, audio-visual aids, etc. However, the information shared by the users on the Internet is generally unorganized and therefore leads to clutter.

Further, list-based format is a very popular form of communicating information, in particular, about groups of related items. For example, a user may post a recipe of making a "Cheese Sandwich" including a list of ingredients required in order to make the Cheese Sandwich. Further, there may be hundreds of other users who may have posted similar and/or related lists.

Further, there are several lists making platforms available on the Internet. Currently, the available list making platforms have a number of disadvantages. First, the available list making platforms do not provide an intuitive and user friendly interface to a user to input a list title. Further, the available list making platforms are not capable of ensuring non-duplicity in the lists prepared by different users and/or automatically identifying relationships between a plurality of lists based on corresponding list titles.

Further, the current list making platforms commonly ask the user to type a list title in the form of a descriptive phrase/sentence. This means that one user may type "best films ever made", while another user may type, "best movies ever released". Further, in the currently available list making platforms, lists cannot be compared side by side with different users because the list titles do not match.

Therefore, there is a need for improved methods and system for facilitating creation of lists and in particular creation of list titles that may overcome one or more of the abovementioned problems and/or limitations.

SUMMARY

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

According to some embodiments, a method of facilitating management of lists is disclosed. The method may include transmitting, using a communication device, an interface to a user device. Further, the interface may be configured for facilitating creation of a list title. Further, the method may include receiving, using the communication device, a plurality of selections corresponding to the interface from the user device. Further, the method may include generating, using a processing device, the list title based on the plurality of selections. Further, the method may include storing, using a storage device, the list title in association with a user identifier associated with the user device and an indication of a list of items associated with the list title. Further, the method may include transmitting, using the communication device, the list title to the user device.

According to some embodiments, a system for facilitating management of lists is also disclosed. The system may include a communication device configured for transmitting an interface to a user device. Further, the interface may be configured for facilitating the creation of a list title. Further, the communication device may be configured for receiving a plurality of selections corresponding to the interface from the user device. Further, the communication device may be configured for transmitting the list title to the user device. Further, the system may include a processing device configured for generating the list title based on the plurality of selections. Further, the system may include a storage device configured for storing the list title in association with a user identifier associated with the user device and an indication of a list of items associated with the list title.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 20 is a user interface of the application for displaying everyone's lists, in accordance with some embodiments.

FIG. 21 is a user interface of the application for displaying other user's lists, in accordance with some embodiments.

FIG. 23 is a user interface of the application for displaying other user's lists, in accordance with some embodiments.

Figure 32:
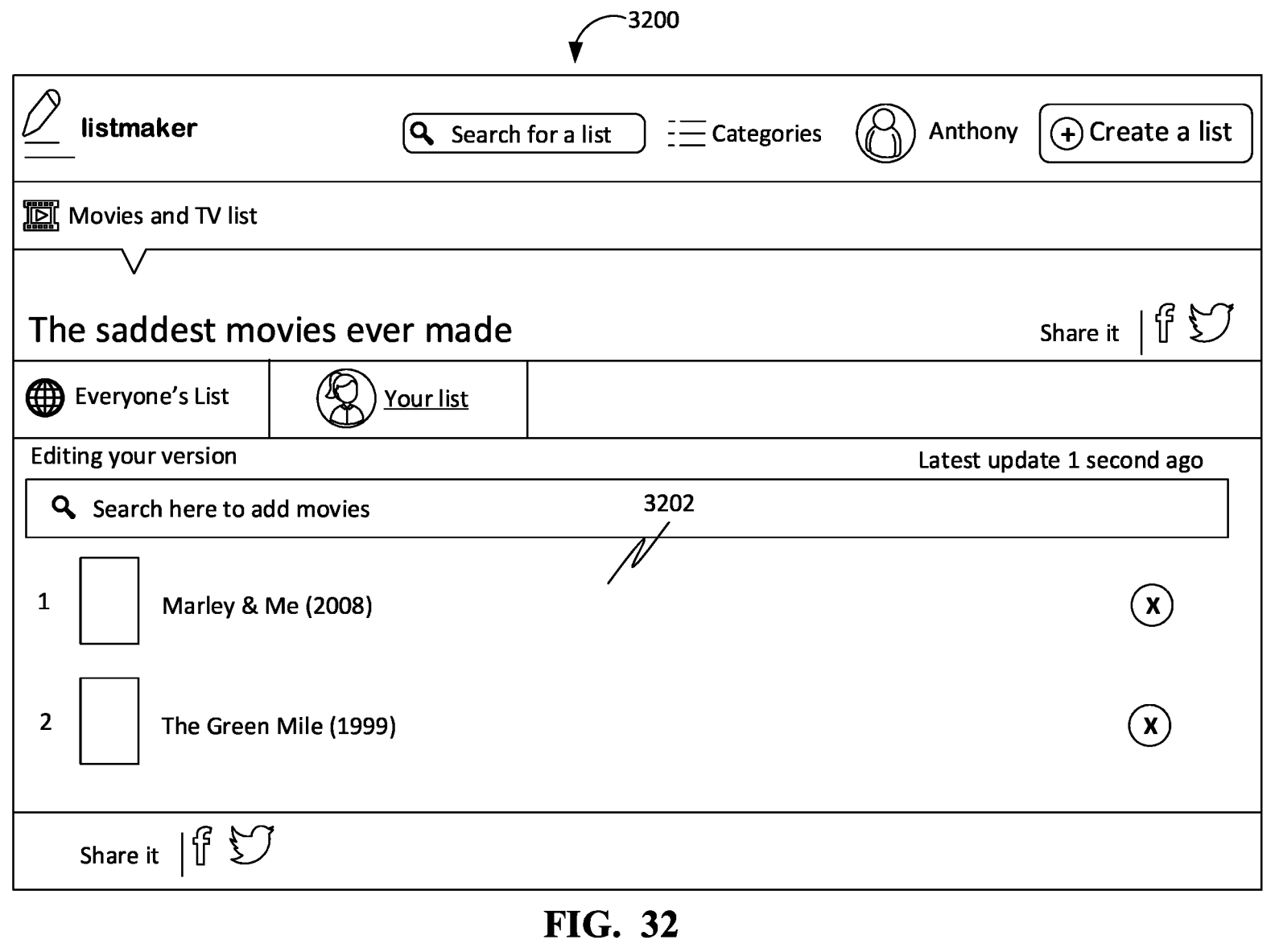

FIG. 32 is a user interface of the application for editing a list, in accordance with some embodiments.

DETAIL DESCRIPTIONS OF THE INVENTION

Figure 1:
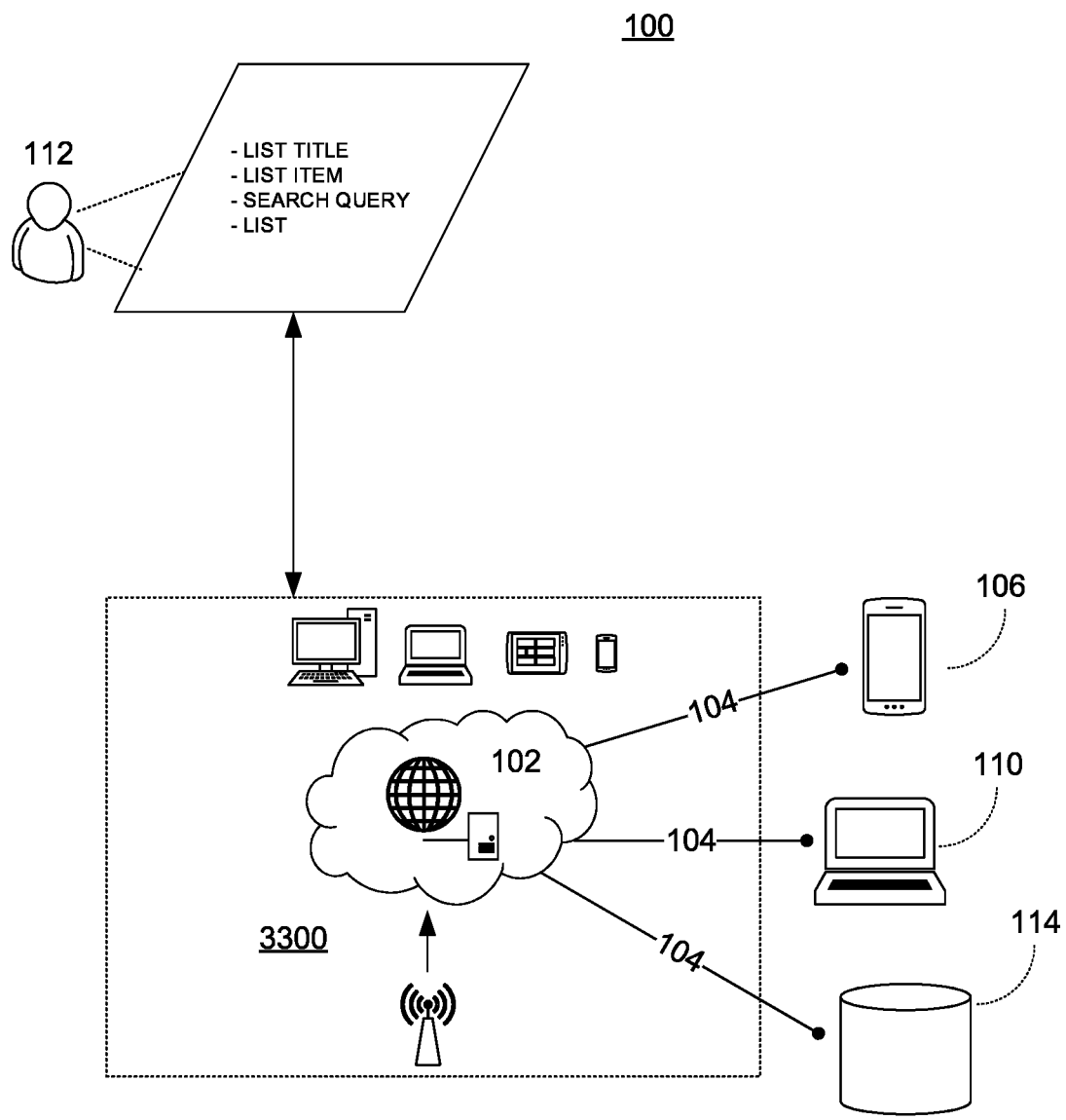
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods.

Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of facilitating the creation of lists, embodiments of the present disclosure are not limited to use only in this context.

Overview

According to some embodiments, online platform, methods and system are provided for facilitating the creation of list titles. In an instance, the online platform may facilitate the creation of list titles by providing an interface (e.g. a GUI) to a user and receiving selections from the user.

According to some embodiments, the disclosed method may include a step of transmitting, using a communication device, an interface (e.g. a GUI) to a user device for creating a list title. Accordingly, the user device may be configured to display the interface. In an instance, the online platform may present a list making form, which includes drop-down menus. Further, the drop-down menus may include field options, which may be terms and/or phrases that are a part of standard vocabulary predetermined and stored on the online platform.

Further, the method may include a step of receiving, using the communication device, selections corresponding to the drop-down menus from the user. In an instance, a selection may represent field options that the user may select from a particular drop-down menu in order to create the list title. In some embodiments, the online platform may also receive the selections from the user based upon presenting a standard vocabulary from which the user may select words, which aptly describe the list title. For example, the online platform may first present a list of adjectives, such as good, best, worst, top, amazing, etc. Accordingly, the user may select a most appropriate adjective that suits the list title. Further, the online platform may present a list of subjects, such as, for example, movies, books, places, hotels, mobiles, etc. Accordingly, the user may select the most appropriate subject in relation to the list title. Further, upon receiving selections from the user, the online platform may store the selections in a cloud-based database, giving each selection a unique ID, such as Adjective_ID, subject_ID, etc.

Further, the method may include a step of generating, using the processing device, the list title. For example, in an instance, the online platform may concatenate the multiple selections (e.g. "Top", "10", "horror", "movies") provided by the user to generate a list title string, e.g. "Top 10 horror movies". Further, in some embodiments, based on the selections made by the user, the online platform may suggest a plurality of list titles that may suitably define vocabulary selections as made by the user. For example, if the user selects "Best" and "Foods", then the online platform may present suggestions corresponding to the list title, such as, for example, "best homemade food recipes", "best food outlets in city X", "best cities to eat street food", "best city to eat healthy food", etc. Accordingly, in some embodiments, the method may further include a step of receiving, using the communication device, a list title selection from the user. In an instance, the user may select one of the list titles as suggested by the online platform.

Further, the method may include a step of storing the list title. In an instance, the online platform may save the list title provided by the user for further steps of list creation, such as, for example, creating list items, selecting list type, selecting list audience, selecting a number of list items, selecting list format, etc.

In some embodiments, while presenting the interface to the user for creating the list title, the user may first select the context from a first drop-down menu, which may include contexts such as, movies, restaurants, books, magazines, hotels, tourist places, countries, hill stations, food etc. Alternatively, in some embodiments, the context may be provided by the user through a free-form text field. Further, the online platform may dynamically generate a second drop-down menu (comprising field options) based on the context selected in the first drop-down menu. Further, the user may select a term and/or a phrase from the field options suggested by the second drop-down menu. Accordingly, the online platform may dynamically generate different drop-down menus as per the user input. For example, first, the user may select context (using the first drop-down menu) as movies. Further, a second drop-down menu may appear on the form, which includes field options such as, best, worst, happiest, saddest etc. Further, based upon an input obtained from the subject drop-down menu, the online platform may generate a third menu that includes field options such as, for example, "to watch with the lights off", "to watch in the summer", or other situational phrases to complete the list sentence. Further, based upon an input obtained from the subject drop-down menu, the online platform may generate an additional menu that includes subject filters such, for example, "movies" may have subject filters: "genre", "year", "starring actress", "directed by". Accordingly, with reference to the subject filter drop-down menu, when "starring actress" filter is applied, the online platform may search an external database and/or a data source that includes the names of actresses. Accordingly, the online platform may present options to the user, which includes the names of movie actresses. Further, a user may select a name of an actress form the options presented to the user. For example, if the list title says, "Best movies starring Nicole Kidman", the application may only return movies with Nicole Kidman as the actress.

According to some embodiments, the user may share the list on one or more social media platforms, such as Facebook™. Further, the user may also enable voting on the list. Accordingly, based upon the number of votes received by a list, the online platform may also reward the user with an incentive. In an instance, the votes on the list can be termed as "upvotes". Further, the user may add comments to each list item of their list. Further, a user may also compare the list with followed users who may have made a list with similar and/or related list title.

According to some embodiments, the online platform may provide a button called "Import". The "Import" button may allow a user to automatically import a list item from a list created by another user. The "Import" button may be present along each list item. In an instance, upon clicking the "Import" button corresponding to a list item, the list item may be automatically imported from a second user's list into a first user's list. For example, if User A wants to import a list item from a list created by User B, then the User A may click on the import button against the list item. Further, the list item may directly be added to a corresponding list created by the User A. In an instance, if no list created by User A matches the list created by the User B, then the online platform may automatically create a new list and include the list item, which is imported by User A from the list created by User B.

According to some embodiments, the online platform may return a page, which corresponds to the usage of adjective specified by a user. In an instance, the user may search for an adjective, say, "Best". Accordingly, the online platform may return a page that mentions all the lists that include the adjective "Best", such as, for example, "Best Games developed by Nintendo". Likewise, the online platform may maintain and/or generate pages corresponding to different fields of the titles such as a subject.

FIG. 1 is an illustration of a platform consistent with various embodiments of the present disclosure. By way of non-limiting example, the online platform 100 for facilitating the creation of lists may be hosted on a centralized server 102, such as, for example, a cloud computing service. The centralized server 102 may communicate with other network entities, such as, for example, a mobile device 106 (such as a smartphone, a laptop, a tablet computer etc.), other electronic devices 110 (such as desktop computers, server computers etc.), and databases 114 (e.g. other online platforms such as moviesweb.com), etc., over a communication network 104, such as, but not limited to, the Internet. Further, users of the platform 100 may include relevant parties such as one or more of gamers, music listeners, movie fans, movie critics, students, chefs, etc. Accordingly, electronic devices operated by the one or more relevant parties may be in communication with the platform. For example, the mobile device 106 may be operated by a movie critic who wants to create a list of best movies ever made based on excellent cinematography.

A user 112, such as the one or more relevant parties, may access platform 100 through a web-based software application or browser. The web-based software application may be embodied as, for example, but not be limited to, a website, a web application, a desktop application, and a mobile application compatible with a computing device 3300.

According to some embodiments, the online platform 100 may be configured to operate in conjunction with a system 200 for facilitating management of lists. The system 200 is explained in detail below.

Figure 2:
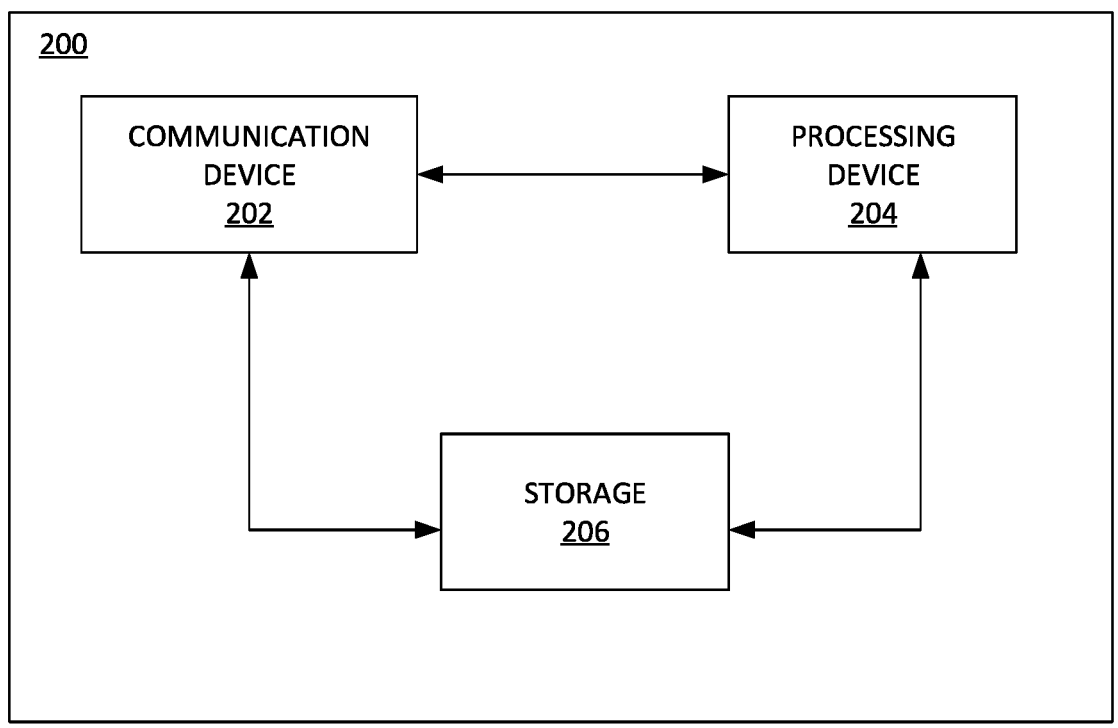
FIG. 2 is a block diagram of a system for facilitating management of lists, in accordance with various embodiments of the present disclosure.

FIG. 2 is a block diagram of the system 200 for facilitating management of lists, in accordance with various embodiments of the present disclosure. The system 200 may include a communication device 202 configured for transmitting an interface to a user device. Further, the interface may be configured for facilitating the creation of a list title. Further, the communication device 202 may be configured for receiving a plurality of selections corresponding to the interface from the user device. Further, the communication device 202 may be configured for transmitting the list title to the user device.

Further, the system 200 may include a processing device 204 configured for generating the list title based on the plurality of selections. Further, the system 200 may include a storage device 206 configured for storing the list title in association with a user identifier associated with the user device and an indication of a list of items associated with the list title.

In some embodiments, the communication device 202 may be further configured for receiving a context selection from the user device. Further, the processing device 204 may be further configured for generating the interface based on the context selection.

In some embodiments, the interface may include a plurality of field options. Further, each field option may include a plurality of predetermined terms. Further, the list title may include one or more of the plurality of predetermined terms.

In some embodiments, the plurality of field options may include a plurality of drop-down menus. Further, each drop-down menu may include a corresponding plurality of predetermined terms. Further, the plurality of field options may be ordered according to a predetermined sequence.

In some embodiments, the storage device 206 may be configured for retrieving a plurality of list titles and indications of a plurality of list of items. Further, the plurality of list titles corresponds to a plurality of user devices. Further, the plurality of list titles may include the list title. Further, the storage device 206 may be configured for storing a master list identifier associated with the master list in association with the list title. Further, the processing device 204 may be configured for analyzing the plurality of list titles and generating the master list based on the analyzing. Further, the master list may include an indication of each item in the plurality of list of items. Further, the communication device 202 may be configured for transmitting the master list to the user device.

In some embodiments, the plurality of field options corresponds to an adjective and a subject. Further, a first selection of a first field option corresponding to the adjective may be associated with an adjective identifier. Further, a second selection of a second field option corresponding to the subject may be associated with a subject identifier. Further, the plurality of selections may include the first selection and the second selection. Further, the list title may be associated with each of the adjective identifier and the subject identifier.

In some embodiments, the communication device 202 may be configured for receiving a query including one or more of the subject identifier and the adjective identifier from the user device. Further, the communication device 202 may be configured for transmitting at least one list title to the user device. Further, the storage device 206 may be configured for retrieving the at least one list title based on the query. Further, the at least one list title may include the list title.

In some embodiments, the plurality of field options may include a first field option and a second field option. Further, the plurality of selections may include a first selection corresponding to the first field option. Further, the processing device 204 may be further configured for generating the second field option based on the first selection.

In some embodiments, the processing device 204 may be configured for generating a plurality recommended list titles based on the plurality of selections. Further, the communication device 202 may be configured for receiving a list title selection from the user device. Further, the generating of the list title may be further based on the list title selection.

In some embodiments, the communication device 202 may be configured for receiving the indication of the list of items associated with the list title from the user device. Further, the communication device 202 may be configured for transmitting the indication of the list of items and the list title to a plurality of user devices. Further, the communication device 202 may be configured for receiving feedback associated with the list title from the plurality of user devices. Further, the storage device 206 may be configured for storing the indication of the list of items in association with the list title. Further, the storage device 206 may be configured for storing the feedback in association with the list title and the indication of the list of items.

Figure 3:
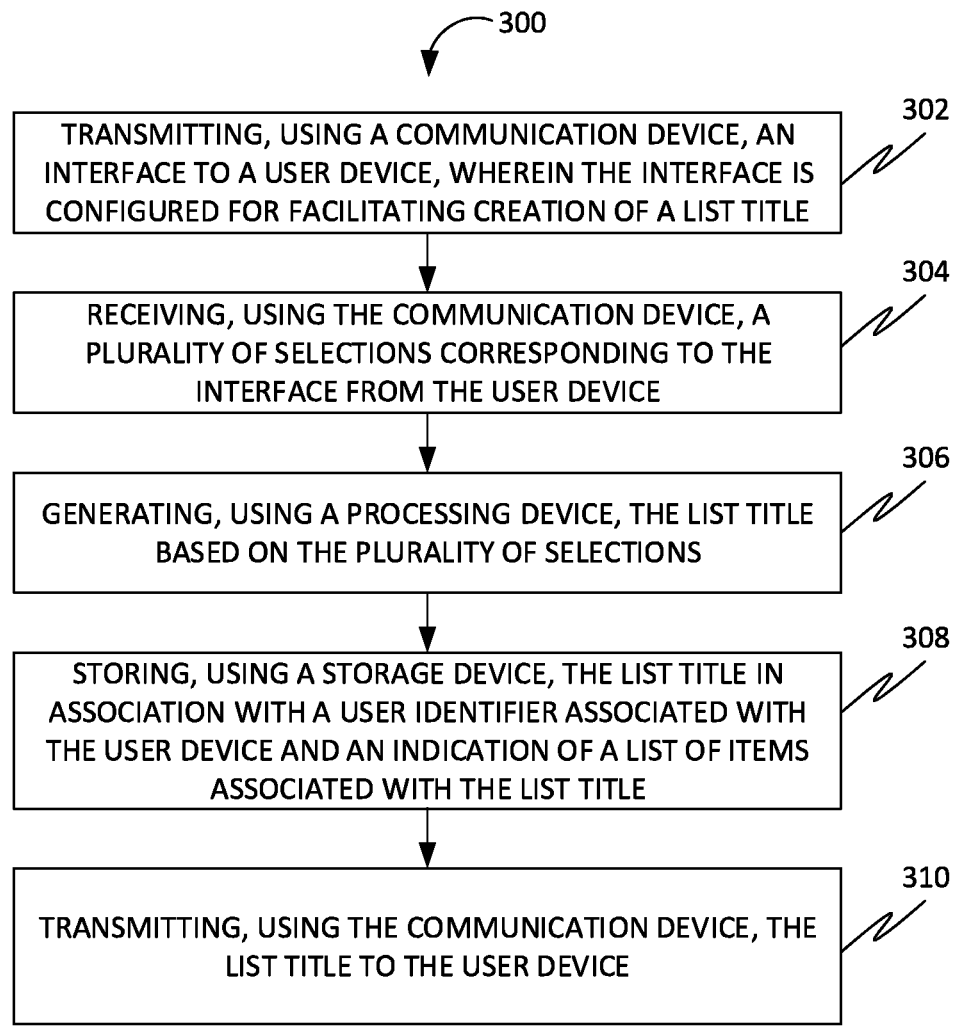
FIG. 3 is a flowchart of a method of facilitating management of lists in accordance with an exemplary embodiment.

FIG. 3 is a flowchart of a method 300 of facilitating management of lists in accordance with an exemplary embodiment. At 302, the method 300 may include transmitting, using a communication device, an interface to a user device. Further, the interface may be configured for facilitating the creation of a list title. In some embodiments, the interface may include a plurality of field options. Further, each field option may include a plurality of predetermined terms. Further, the list title may include one or more of the plurality of predetermined terms. In some embodiments, the plurality of field options may include a plurality of drop-down menus. Further, each drop-down menu may include a corresponding plurality of predetermined terms. Further, the plurality of field options may be ordered according to a predetermined sequence.

Further, at 304, the method 300 may include receiving, using the communication device, a plurality of selections corresponding to the interface from the user device. Further, at 306, the method 300 may include generating, using a processing device, the list title based on the plurality of selections. Further, at 308, the method 300 may include storing, using a storage device, the list title in association with a user identifier associated with the user device and an indication of a list of items associated with the list title. Further, at 310, the method 300 may include transmitting, using the communication device, the list title to the user device.

Figure 4:
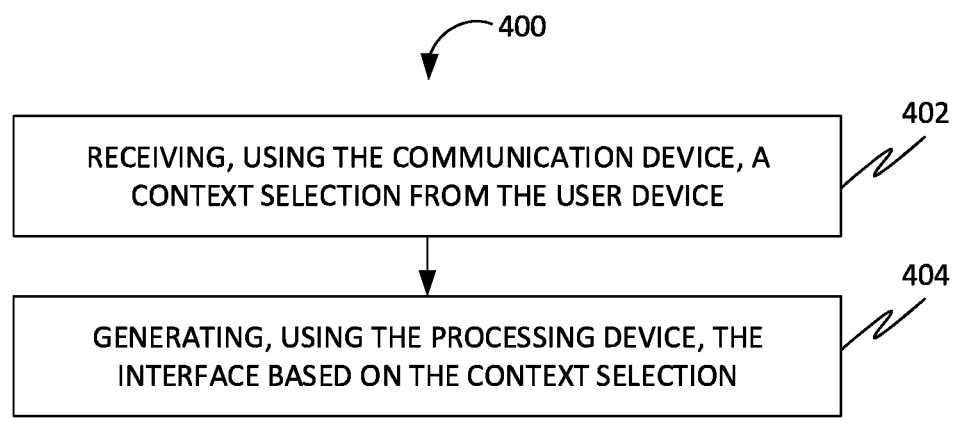
FIG. 4 is a flowchart of a method of customizing an interface based on a context in accordance with further embodiments.

FIG. 4 is a flowchart of a method 400 of customizing the interface based on a context in accordance with further embodiments. At 402, the method 400 may include receiving, using the communication device, a context selection from the user device. Further, at 404, the method 400 may include generating, using the processing device, the interface based on the context selection.

Figure 5:
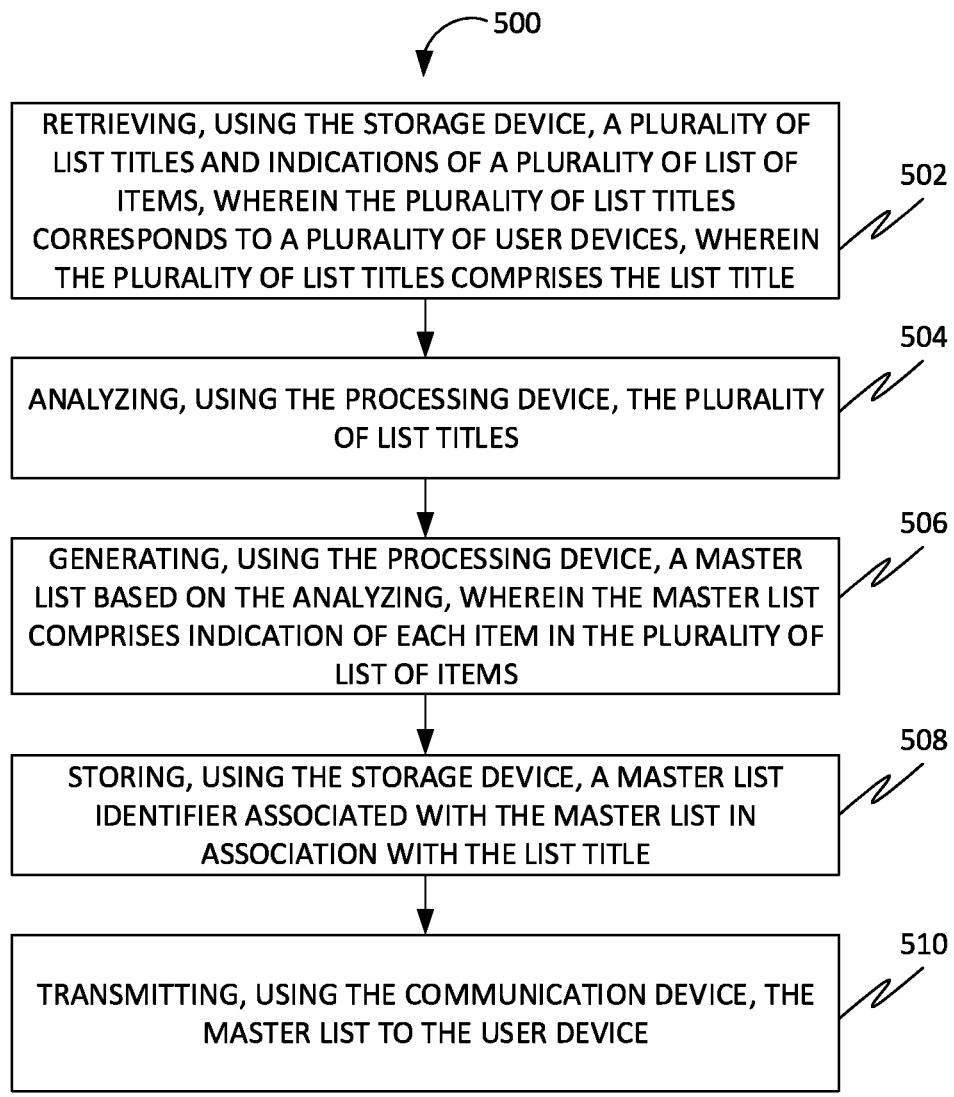
FIG. 5 is a flowchart of a method of creating a master list in accordance with further embodiments.

FIG. 5 is a flowchart of a method 500 of creating a master list in accordance with further embodiments. At 502, the method 500 may include retrieving, using the storage device, a plurality of list titles and indications of a plurality of list of items. Further, the plurality of list titles corresponds to a plurality of user devices. Further, the plurality of list titles may include the list title.

Further, at 504, the method 500 may include analyzing, using the processing device, the plurality of list titles. Further, at 506, the method 500 may include generating, using the processing device, a master list based on the analyzing. Further, the master list may include an indication of each item in the plurality of list of items.

Further, at 508, the method 500 may include storing, using the storage device, a master list identifier associated with the master list in association with the list title. Further, at 510, the method 500 may include transmitting, using the communication device, the master list to the user device.

In some embodiments, the plurality of field options corresponds to an adjective and a subject. Further, a first selection of a first field option corresponding to the adjective may be associated with an adjective identifier. Further, a second selection of a second field option corresponding to the subject may be associated with a subject identifier. Further, the plurality of selections may include the first selection and the second selection. Further, the list title may be associated with each of the adjective identifier and the subject identifier.

In some embodiments, the plurality of field options may include a first field option and a second field option. Further, the plurality of selections may include a first selection corresponding to the first field option. Further, the processing device may be further configured for generating the second field option based on the first selection.

Figure 6:
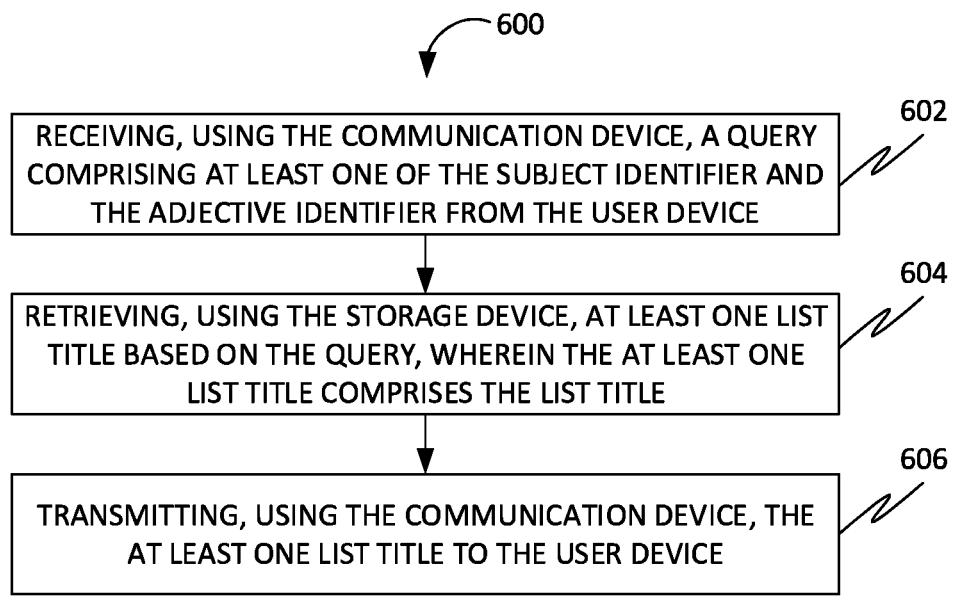
FIG. 6 is a flowchart of a method of obtaining a list title in accordance with further embodiments.

FIG. 6 is a flowchart of a method 600 of obtaining a list title in accordance with further embodiments. At 602, the method 600 may include receiving, using the communication device, a query including one or more of the subject identifier and the adjective identifier from the user device. At 604, the method 600 may include retrieving, using the storage device, at least one list title based on the query. Further, the at least one list title may include the list title. Further, at 606, the method 600 may include transmitting, using the communication device, the at least one list title to the user device.

Figure 7:
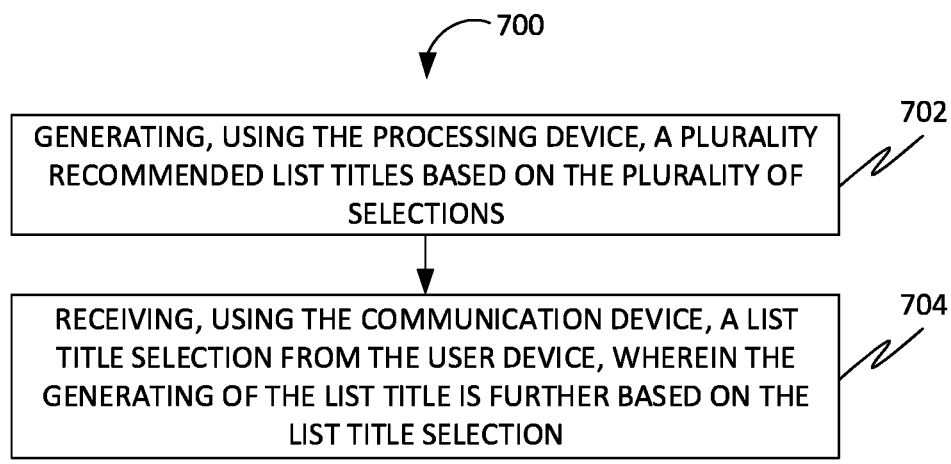
FIG. 7 is a flowchart of a method of selecting a list title in accordance with further embodiments.

FIG. 7 is a flowchart of a method 700 of selecting a list title in accordance with further embodiments. At 702, the method 700 may include generating, using the processing device, a plurality recommended list titles based on the plurality of selections. Further, at 704, the method 700 may include receiving, using the communication device, a list title selection from the user device. Further, the generating of the list title may be further based on the list title selection.

Figure 8:
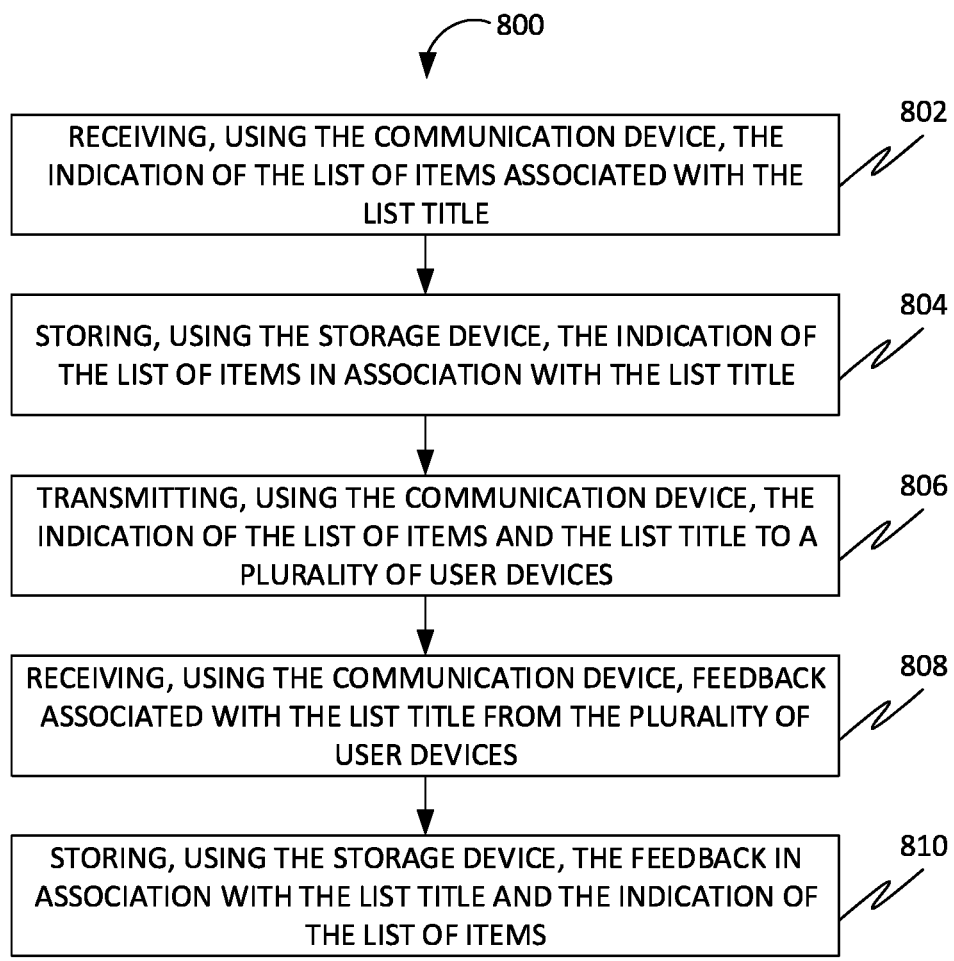
FIG. 8 is a flowchart of a method of obtaining feedback for a list title in accordance with further embodiments.

FIG. 8 is a flowchart of a method 800 of obtaining feedback for a list title in accordance with further embodiments. At 802, the method 800 may include receiving, using the communication device, the indication of the list of items associated with the list title. Further, at 804, the method 800 may include storing, using the storage device, the indication of the list of items in association with the list title. At 806, the method 800 may include transmitting, using the communication device, the indication of the list of items and the list title to a plurality of user devices. At 808, the method 800 may include receiving, using the communication device, feedback associated with the list title from the plurality of user devices. Further, at 810, the method 800 may include storing, using the storage device, the feedback in association with the list title and the indication of the list of items.

Figure 9:
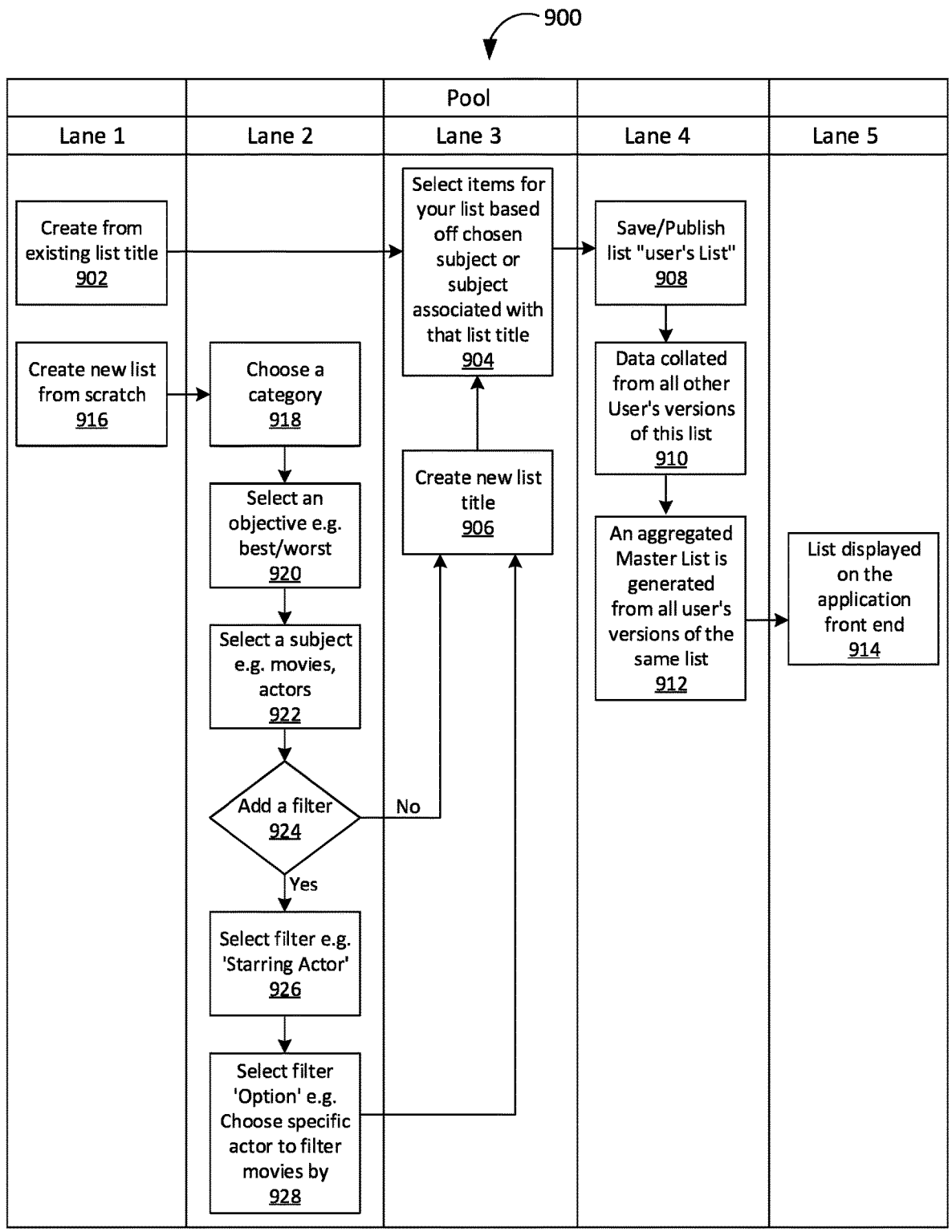
FIG. 9 is a flowchart of a method of facilitating creation of list titles, in accordance with some embodiments.

FIG. 9 is a flowchart of a method 900 of facilitating the creation of list titles, in accordance with some embodiments. The method 900 may be executed in conjunction with the online platform 100. According to some embodiments, the method 900 may allow the user to create a list title either from scratch and/or from an existing list title. At 902, the user may opt to create the list title from an existing list title. Then, at 904, the user may be requested to select the list items based upon a subject chosen by the user and/or a subject associated with the list title. In an instance, the online platform 100 may provide list items as suggestions to the users. Accordingly, the online platform 100 may communicate with other databases, such as, for example, moviesweb.com (a movie database). Accordingly, if the user wants to create a list of top thriller movies, then the online platform 100 may query other databases, which may store information relevant to the list (e.g. movie titles, movie ratings, other lists of thriller movies etc.).

Accordingly, the user may select one of the list items suggested by the online platform 100 and create a list at 906. Further, at 908, the method 900 may include saving and/or publishing the list created by the user. For example, the list may be published on the online platform 100. In an instance, once the list is published on the online platform 100, the list created by the user may become live and accordingly, other users accessing the online platform 100 may be able to view the list. Further, the list created by the user may be called "User's List".

Then, at 910, the method 900 may include collating data from all other similar lists created by other users. In an instance, once a list created by a user is published on the online platform 100, the online platform 100 may simultaneously search for similar lists created by other users on the online platform 100. Accordingly, the online platform 100 may show one or more lists that have the same list title as that of the list created by the user. For example, if a first user creates a list called, "Best superhero movies", the online platform 100 may present a number of lists that have the same title as of the list created by the first user.

Then, 912, the method 900 may include generating a master list. In an instance, the master list may include the list items that are common in all the lists created by a plurality of users. For example, if ten users have created a list named "Best hill stations in Colorado", the online platform 100 may analyze all the list items (names of hill stations) mentioned in all different versions of lists, and then accordingly create a master list. The master list may include names of hill stations that were found common in all the different versions of lists created by the ten users. Further, at 914, the method 900 may include displaying the master list as well as the user list on the front-end of a mobile and/or a web application.

According to some embodiments, the online platform 100 may create a list item page. In an instance, a user may select a list item from a list. Accordingly, the online platform 100 may search the list item selected by the user in internal and/or external databases. Further, the online platform 100 may return a page that includes lists that have the list item as selected by the user. For example, if the user selects a list item called, "Interstellar", then the online platform 100 may present a page that includes all the lists that mentions "Interstellar" as one of the list items. Accordingly, the page may include lists having titles such as, "Best sci-fi movies ever made", "Best Movies ever made", "Best movies directed by Christopher Nolan", etc.

Further, at 916, the user may opt to create a list title from scratch, then the user may first select a category corresponding to the list title at 918. In an instance, the online platform 100 may present a list of categories from which the user may choose a most appropriate category that suits the list title. At 920, the method 900 may include the user selecting an adjective from a list of adjectives, such as, bad, worst, good, amazing etc. The adjective may be related to the objective behind creating the list. Thereafter, at 922, the method 900 may include the user selecting a subject and/or a category that captures the core aspect of the list title. For example, if the user is creating a list for "Best soccer players ever", then the category may be sports and/or football. At 924, the method 900 may provide an option to the user to add a filter. If the user chooses to add a filter, then at 926, the method 900 may include selecting a filter from a list of filters. For example, if the user is creating a list for "Best movies", then the filter may include options such as, "starring Al Pacino", "directed by James Cameron", "based on aliens" etc. Accordingly, the online platform 100 may also contact an external API data source and/or an external or internal database to retrieve the filter option i.e. in this case "Al Pacino". At 928, the user may select a filter option such as, for example, choose a specific actor to filter movies. Further, the online platform 100 may concatenate all the selections made by the user and accordingly create a list title at 906. Further, at 924, if the user chooses not to add a filter, then the method 900 may create a list title at 906.

Further, the user may select the list items associated with the list created by the user. Thereafter, the list may be saved and published on the online platform 100. Accordingly, the list may be made live on the mobile and/or the web application that is used to access the online platform 100. Further, the online platform 100 may create a master list by collating data from all the similar versions of the list created by other users. Accordingly, an aggregated master list may be generated and published on the online platform 100. Further, both versions of the list, i.e., the User's list and the master list may be added on the front-end of the mobile and/or the web application used to access the online platform 100.

According to some embodiments, the user may upload a list along with a free-form list title. For instance, the user may import lists created on another website (e.g. moviesweb.com). Accordingly, the online platform 100 may analyze the titles and/or content of these lists and suggest revised titles in accordance with a predetermined vocabulary and/or format.

Further, in an instance, the user interface may include a free-form text field. Accordingly, the user may type a title of the list without any restrictions. However, subsequently, the online platform 100 may analyze the title (and optionally the items of the list) and suggest a revised title in accordance with the predetermined vocabulary and/or format.

According to some embodiments, a workflow of list creation process may begin with entering the list items first and then providing a list title for the list. In this instance, the online platform 100 may analyze the list items (e.g. querying other servers/databases) and automatically determine suggested titles for the list and/or determine options for the fields forming the title of the list. Accordingly, the user may either select one of the suggested titles and/or modify one or more fields of the suggested titles through an intuitive drop-down menu. According to some embodiments, ordering of the field options within a drop-down menu may depend on popularity (i.e. a frequency of use by users of the platform). Accordingly, a user creating a list title can find the terms they need without much scrolling.

According to some embodiments, the online platform 100 may include a feature of enabling a user to create a list of items (e.g. movies, games, etc.) by providing auto-suggestions (e.g. best, saddest, best looking) to the user according to previously entered inputs (e.g. classification of list i.e. movies, music, actors etc.) from the user.

Further, the online platform 100 may include a feature of providing a search interface to the user to search for contents to be added to the user created list according to inputs entered by the user (E.g. list of best movies). This may involve integration with the third party servers (e.g. moviesweb.com, games database etc.).

Figure 10:
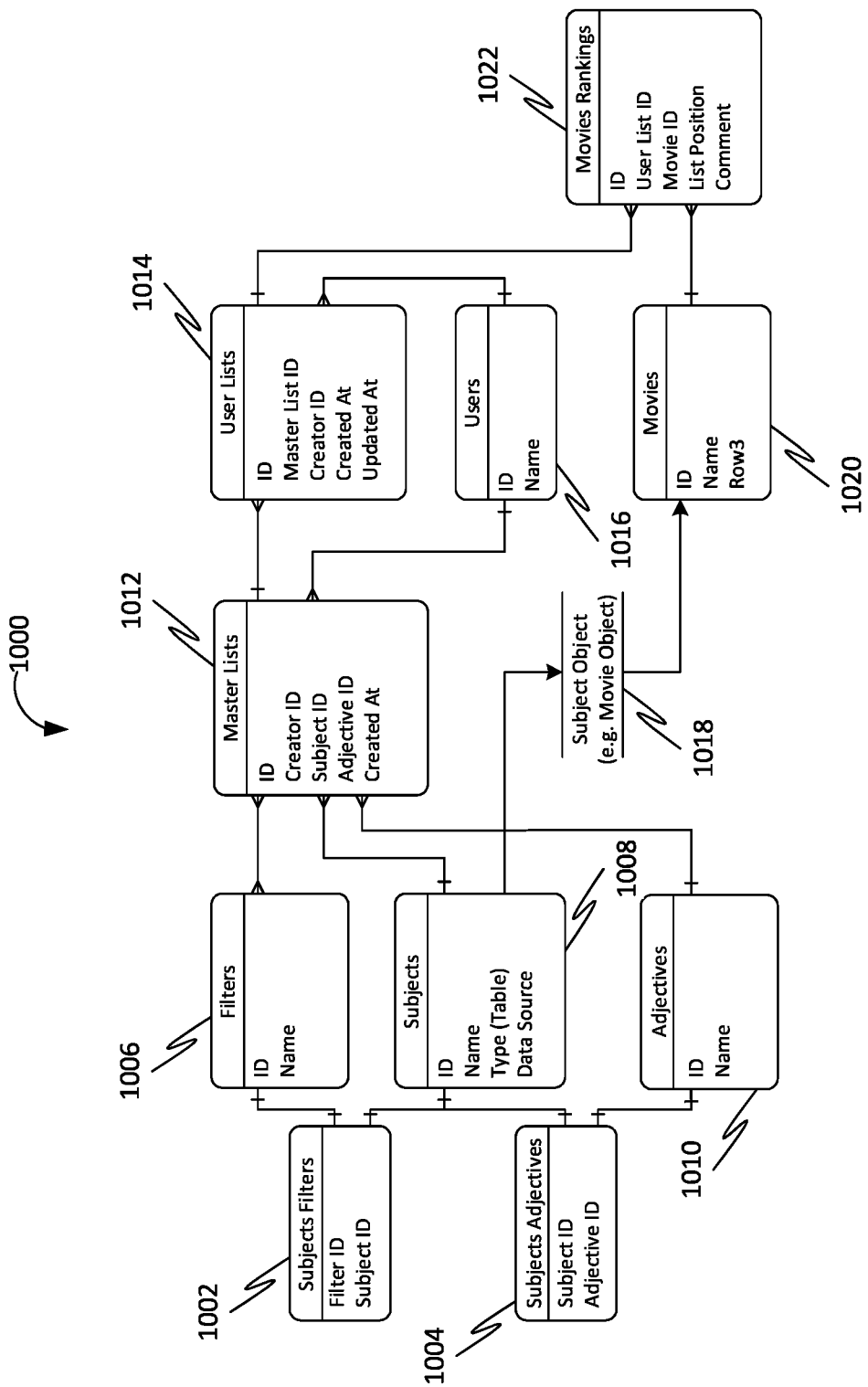
FIG. 10 illustrates an exemplary visualization a database schema for facilitating creation of list titles, in accordance with some embodiments.

FIG. 10 illustrates an exemplary visualization a database schema 1000 for facilitating the creation of list titles, in accordance with some embodiments. The database schema 1000 may include multiple tables such as a subject filers table 1002 (may store a list of filter ID-Subject ID pairs), a subjects adjectives table 1004 (may store a list of adjective ID-Subject ID pairs), a filters table 1006 (may store a list of filters), a subjects table 1008 (may store a list of subjects), an adjectives table 1010 (may store a list of subjects), a master lists table 1012 (may store generated master lists), a user lists table 1014 (may store generated users lists), an users table 1016 (may store list of users), a subject object 1018 (may match subjects with movies), a movies table 1020 (may store a list of movies) and a movies rankings table 1022 (may store rankings of listed movies).

In an instance, the contextual data, i.e., the adjective, the subject, and the optional filter provided by the user may first be mapped to a unique ID. Accordingly, the adjective, the subject, and the optional filter may be mapped to an Adjective_ID, subject_ID, and Filter_ID. Further, the contextual data may be stored in a cloud-based database associated with the online platform 100. In some aspects, the database schema 1000 may include separate IDs for user lists and a master list.

According to an exemplary embodiment, since each adjective, subject and filter have an ID in the cloud-based database associated with the online platform 100, different lists may be compared between friends, by matching up the adjective ID, subject ID and filters ID respectively between the lists. Further, if user 1 is following user 2, and user 2 creates the same list as user 1, user 1 may be notified that the user 2 has recreated their list.

FIGS. 11-32 illustrate various user interfaces of an application for facilitating the creation of list titles, in accordance with some embodiments. FIGS. 11-18 illustrate various user interfaces of a smartphone application for facilitating the creation of list titles. FIGS. 19-32 illustrate various user interfaces of a computer application for facilitating the creation of list titles.

Figure 11:
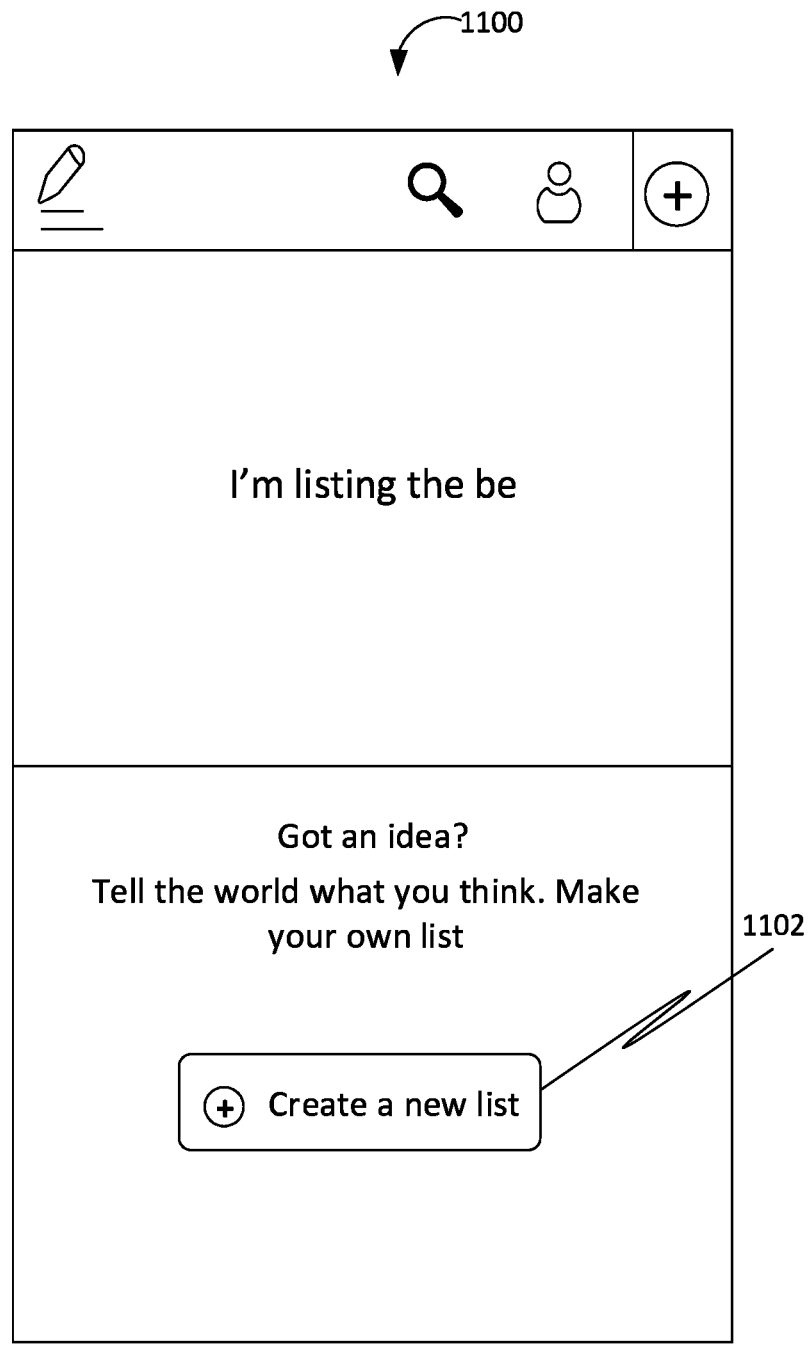
FIG. 11 is a user interface of an application for facilitating the creation of list titles, in accordance with some embodiments.

FIG. 11 is a user interface 1100 of the application for facilitating the creation of list titles, in accordance with some embodiments. A user may activate a "Create a new list" button 1102 on the user interface 1100 to initiate the process to create a new list.

Figure 12:
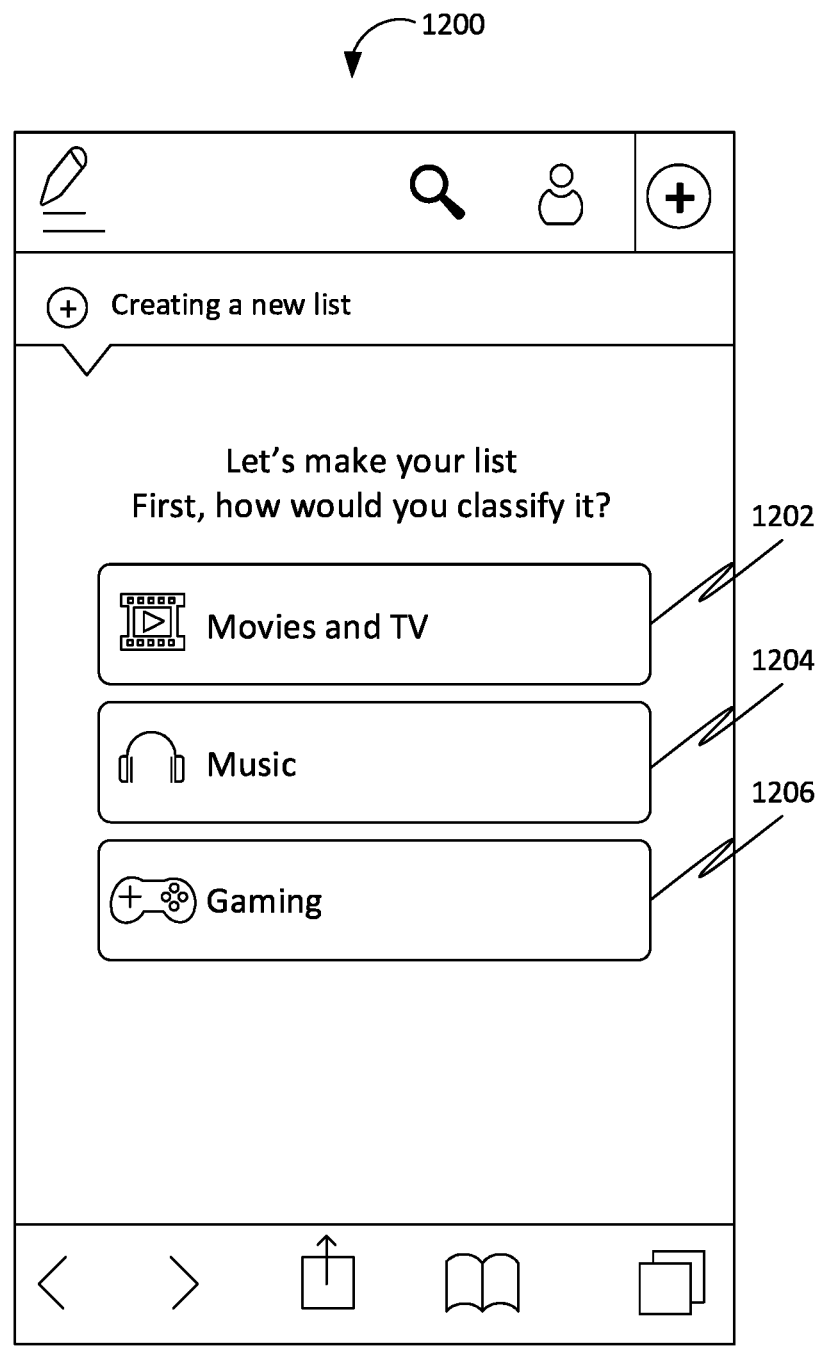
FIG. 12 is a user interface of the application for obtaining a category associated with the list title, in accordance with some embodiments.

In response to activating the "Create a new list" button 1102, the application may display a user interface 1200 shown in FIG. 12. The user may specify a category associated with the list title, such as, for example, movies, books, gaming, TV etc. The user may use at least one of a "movies and TV" button 1202, a "music" button 1204 and a "gaming" button 1206 to select a category. In response, the application may display a user interface 1300 shown in FIG. 13. Further, according to some embodiments, the application may receive input from the user in the form of contextual data associated with a list. In an instance, the contextual data may include elements such as, for example, an adjective, a subject, and an optional filter. For example, if a user wants to make a list of "Best horror movies ever released", then the user may provide the adjective as 'Best', the subject as 'Horror Movies', and the optional filter as 'Ever Released'. Accordingly, the user may type "best" in a text field 1302 on the user interface 1300.

In an exemplary embodiment, the contextual data, i.e., the adjective, the subject, and the optional filter provided by the user may be first mapped to a unique ID. Accordingly, the adjective, the subject, and the optional filter may be mapped to an Adjective_ID, subject_ID, and Filter_ID. Further, the contextual data may be stored in a cloud-based database associated with the online platform 100. In an embodiment, the online platform 100 may store the contextual data as per a database schema (such as the database schema 1000).

Figure 13:
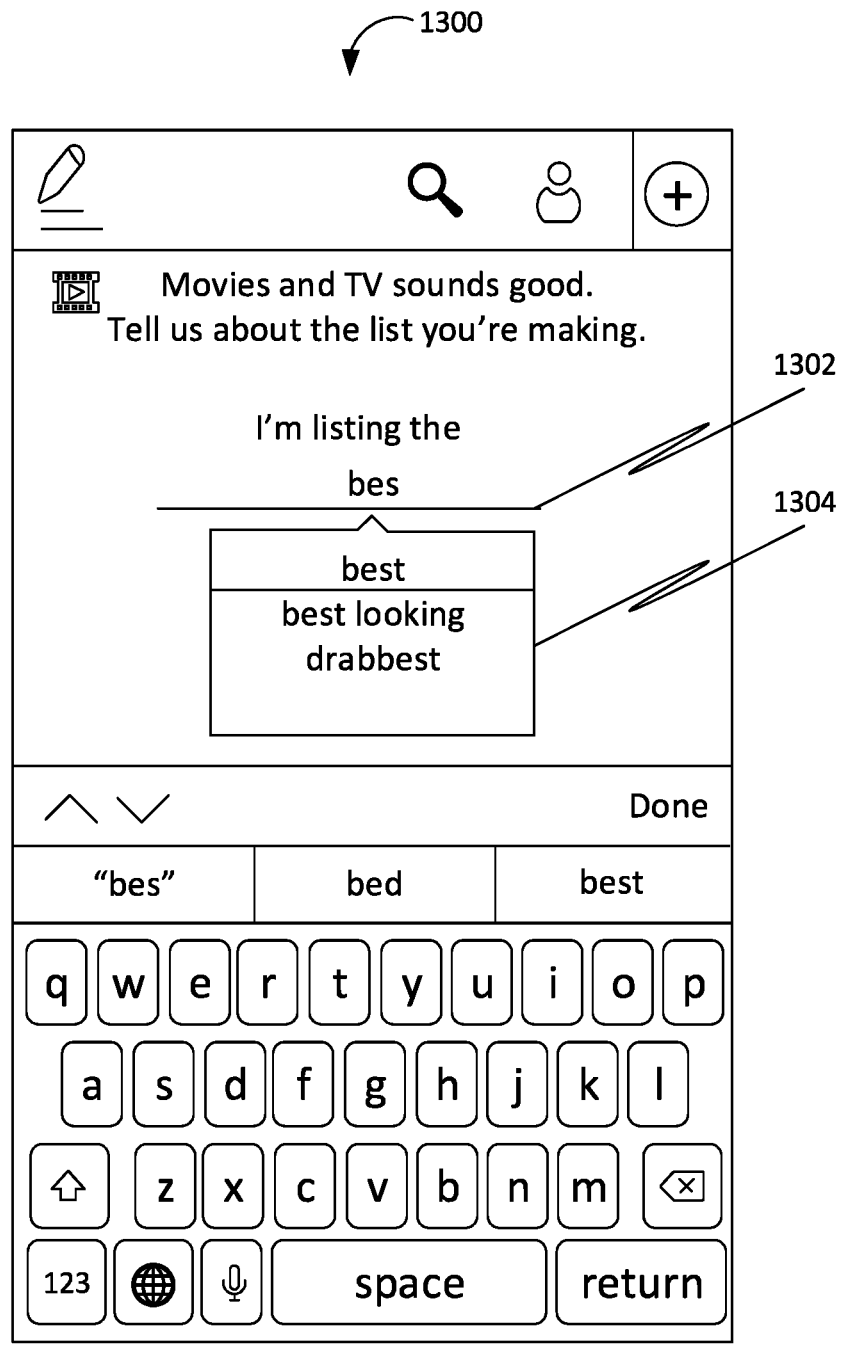
FIG. 13 is a user interface of the application for obtaining an adjective associated with the list title, in accordance with some embodiments.

Further, the application may provide hints to the user as soon as the user starts entering the contextual data. Accordingly, adjective, subject as well as optional filter list may be populated. For instance, if the user starts typing in a text field, then the application may provide words that match the entered character or the set of characters. As shown in FIG. 13, when the user wants to type "best", the application shows a tool-tip 1304 with hints including "best", "best looking" etc.

Figure 14:
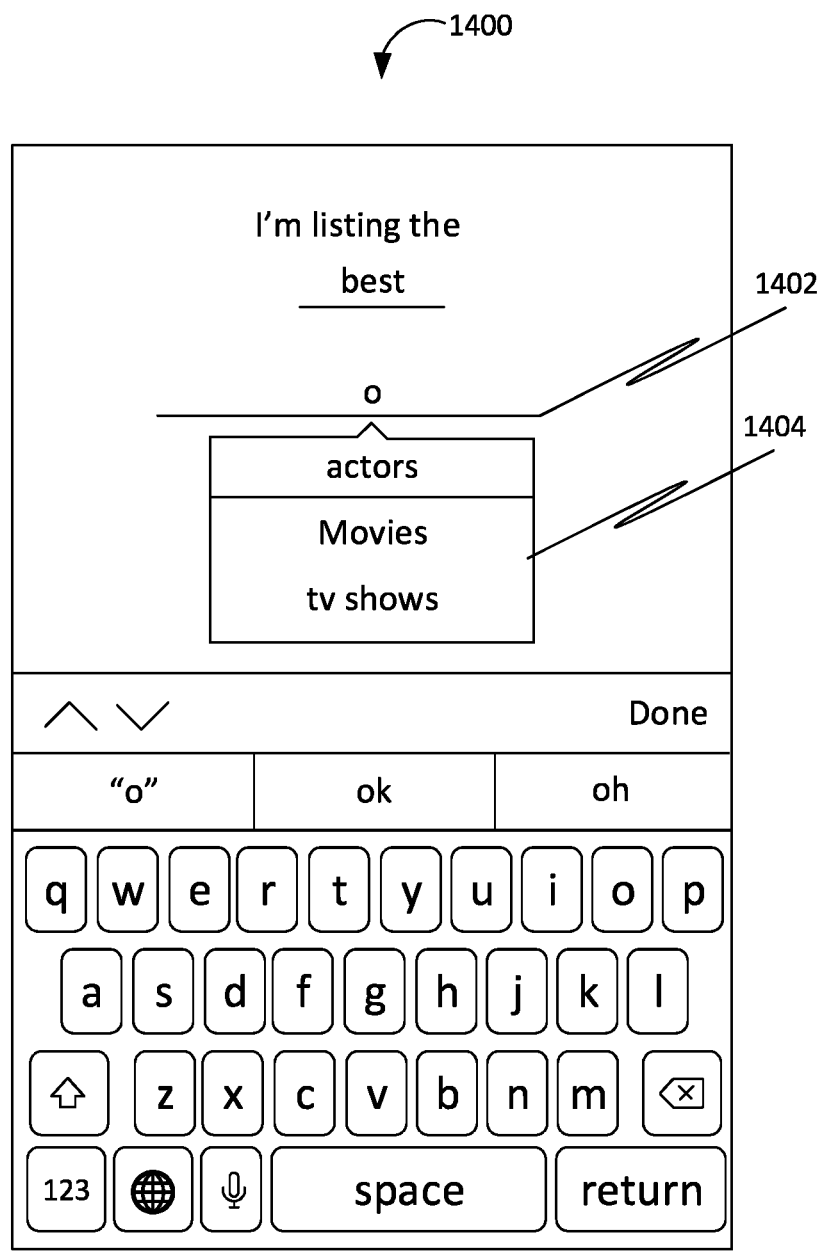
FIG. 14 is a user interface of the application for obtaining a subject associated with the list title, in accordance with some embodiments.
Figure 15:
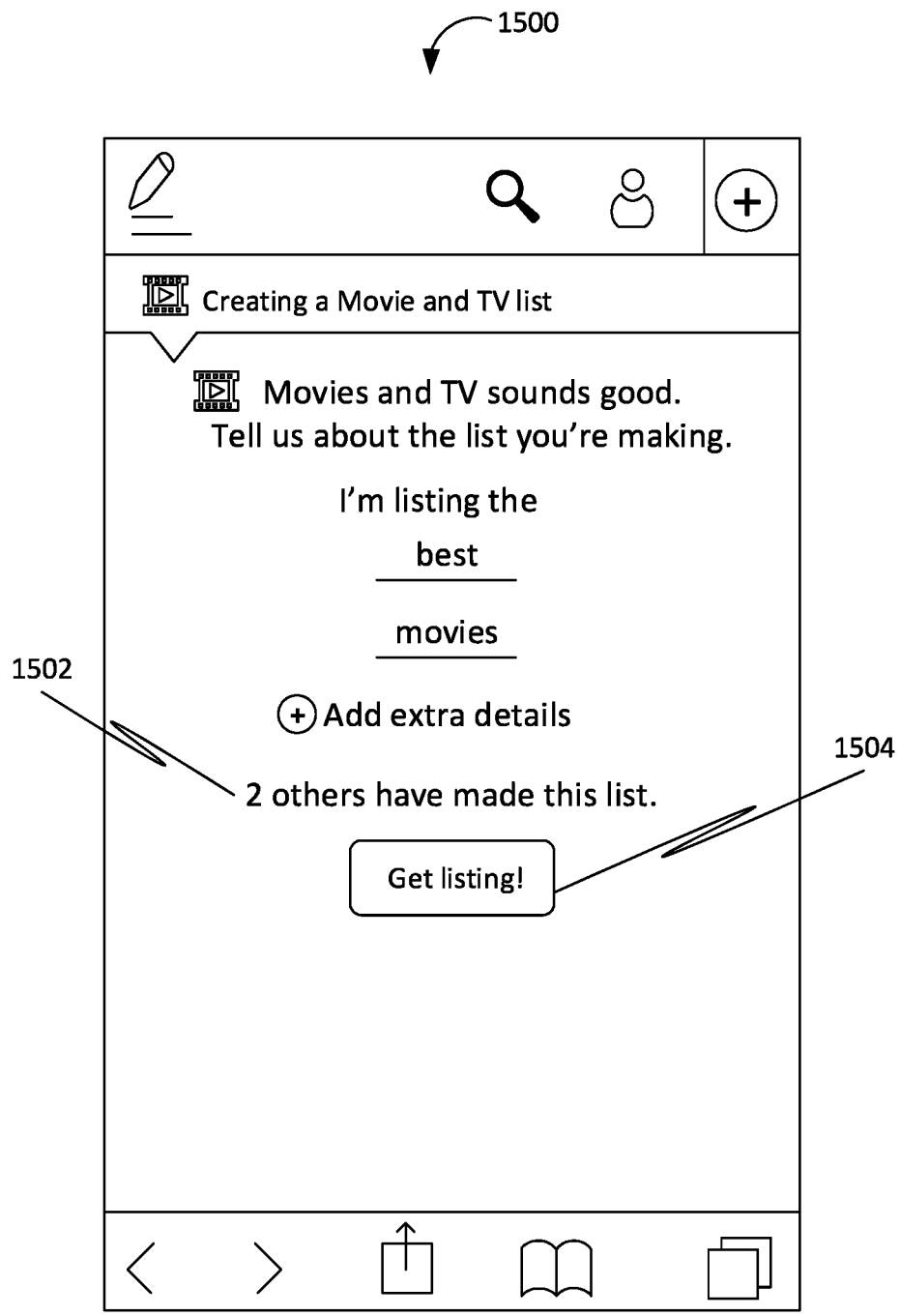
FIG. 15 is a user interface of the application for displaying a number of users that have created similar list, in accordance with some embodiments.

Next, the application displays a user interface 1400 shown in FIG. 14. The user interface 1400 allows the user to provide a subject of the list. The user may type the subject in a text field 1402. Further, the application may show a tool-tip 1404 listing the available options related to the subjects. In an exemplary scenario, the user may select an option "movies" in the tool-tip 1404. In response, the application displays a user interface 1500 shown in FIG. 15. Further, the application may display a number of users 1502 that have created the same list that the user is viewing. Further, the user may activate a "Get listing" button 1504 to create the list.

Figure 16:
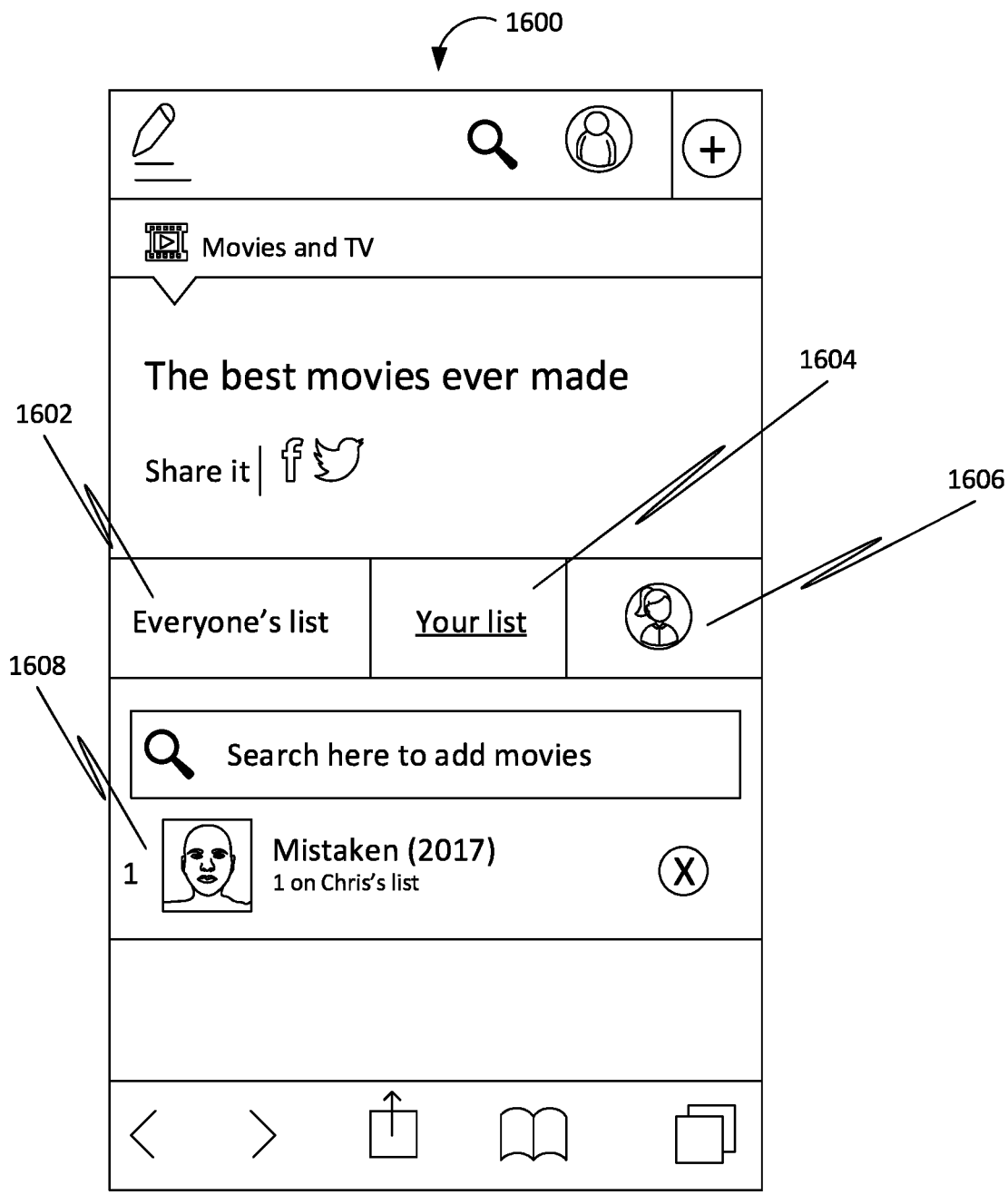
FIG. 16 is a user interface of the application for displaying users lists, in accordance with some embodiments.

Thereafter, the application displays a user interface 1600 shown in FIG. 16. The user interface 1600 includes three tabs—"everyone's list" tab 1602, "your list" tab 1604, and other user's list tab 1606. The "your list" tab 1604 is shown activated in the user interface 1600. At this point in time, the user's list includes one listing 1608 ("Mistaken").

Figure 17:
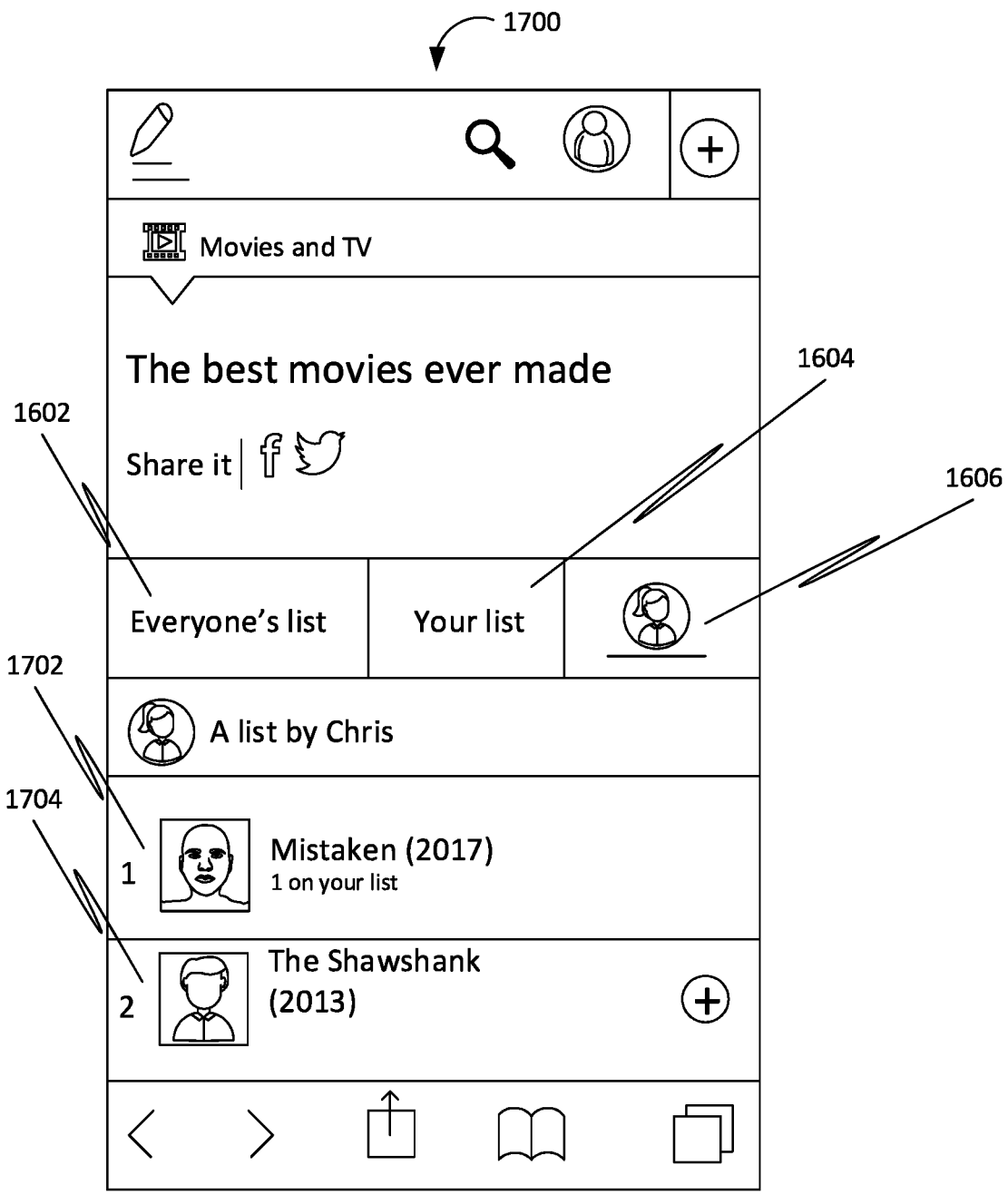
FIG. 17 is a user interface of the application for displaying other user's lists, in accordance with some embodiments

The user may activate the other user's list tab 1606, in response the application displays a user interface 1700 shown in FIG. 17. The other user's list includes two list items 1702-1704.

Figure 18:
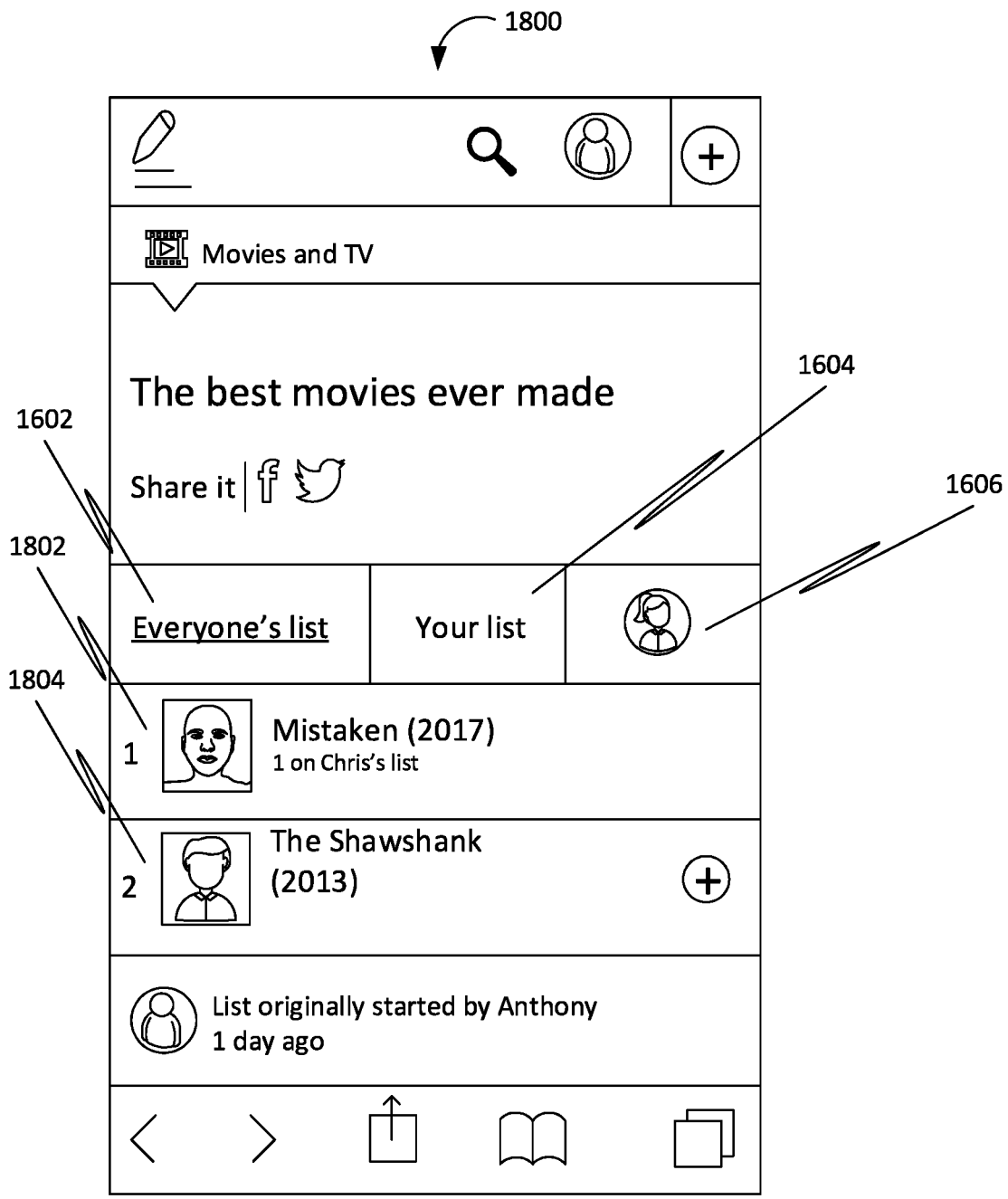
FIG. 18 is a user interface of the application for displaying everyone's lists, in accordance with some embodiments.

Further, the user may activate the "everyone's list" tab 1602, in response the application displays a user interface 1800 shown in FIG. 18. The everyone's list includes two list items 1802-1804.

Figure 19:
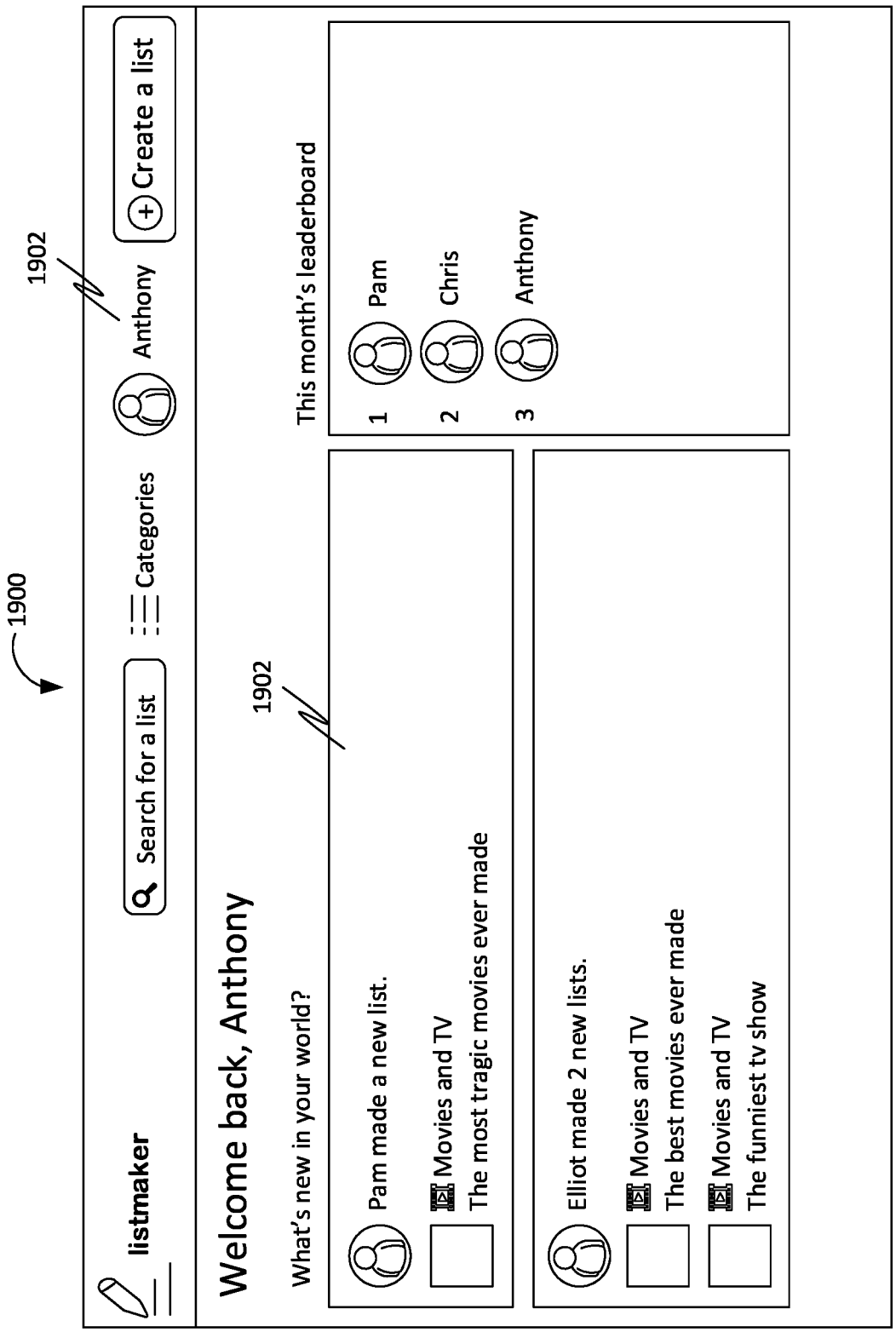
FIG. 19 is a user interface of an application for facilitating creation of list titles, in accordance with some embodiments.
Figure 22:
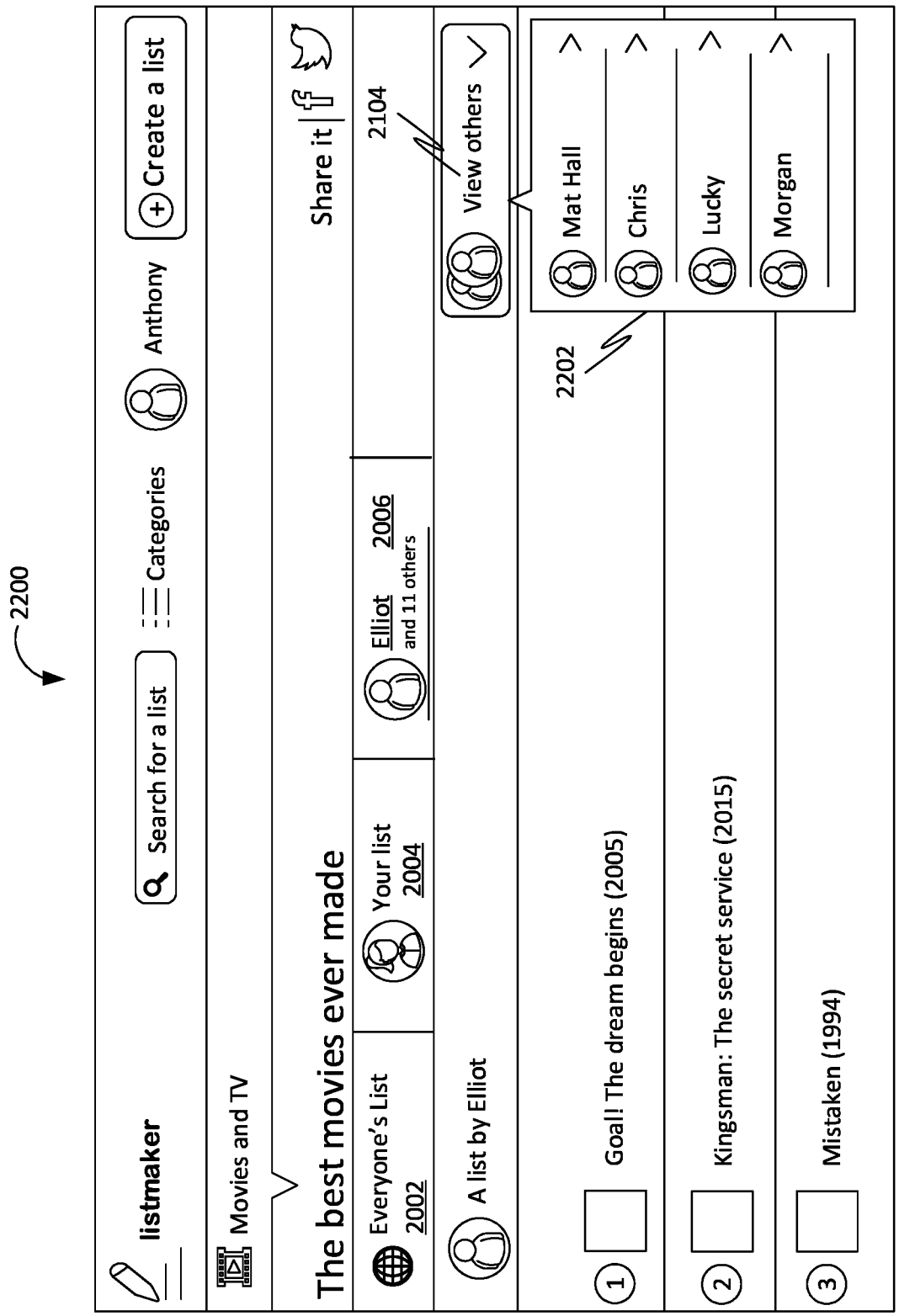
FIG. 22 is a user interface of the application for displaying other user's in a drop-down menu, in accordance with some embodiments.

When a user logs on the application via a computer, the application displays a user interface 1900 shown in FIG. 19. As shown, a user 1902 named Anthony has logged on to the application. The user interface 1900 includes updates 1904 showing new lists creates by other users.

FIG. 20 is a user interface 2000 of the application in accordance with some embodiments. The user interface 2000 shows 3 tabs—an "everyone's list" tab 2002, a "your list" tab 2004 and an other users tab 2006. The "everyone's list" tab 2002 is active on the user interface 2000. Accordingly, the user interface 2000 includes a table 2008 listing lists by all users.

The user may click the other users tab 2006, in response, the application may display a user interface 2100 shown in FIG. 21. The user interface 2100 shows lists 2102 created by another user named "Elliot". The user may use a "view others" button 2104 to view lists by other users. In response, the application displays a drop-down menu 2202 in a user interface 2200 shown in FIG. 22. The drop-down menu 2202 lists other available users including "Mat Hall", "Chris", "Lucky" and "Morgan". The user may select "Chris" from the drop-down menu 2202. In response, the application may display lists 2302 created by the user "Chris" as shown on a user interface 2300 in FIG. 23.

Figure 24:
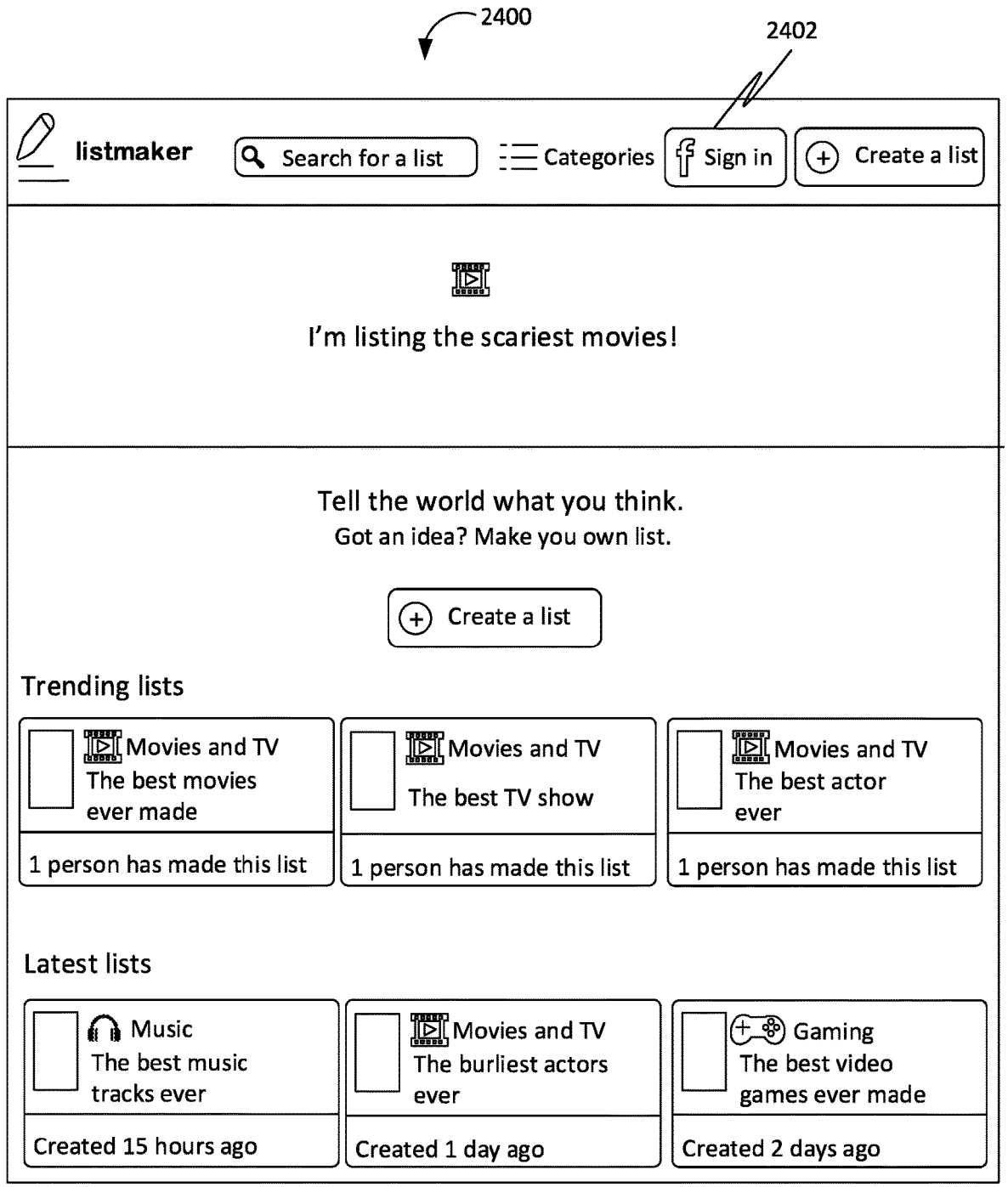
FIG. 24 is a user interface of an application for facilitating the creation of list titles before a user logs in, in accordance with some embodiments.
Figure 25:
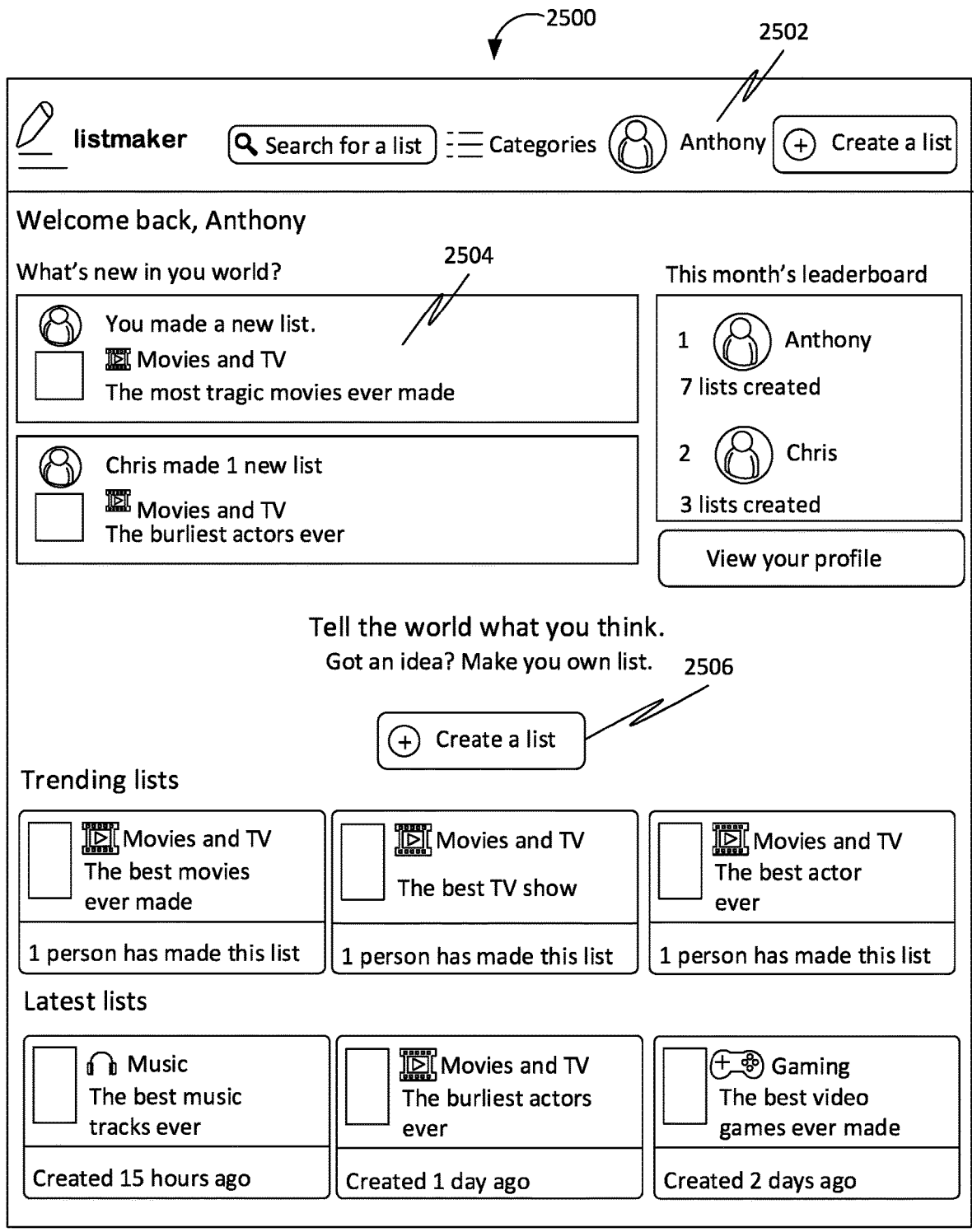
FIG. 25 is a user interface of the application for facilitating the creation of list titles after the user logs in, in accordance with some embodiments.
Figure 26:
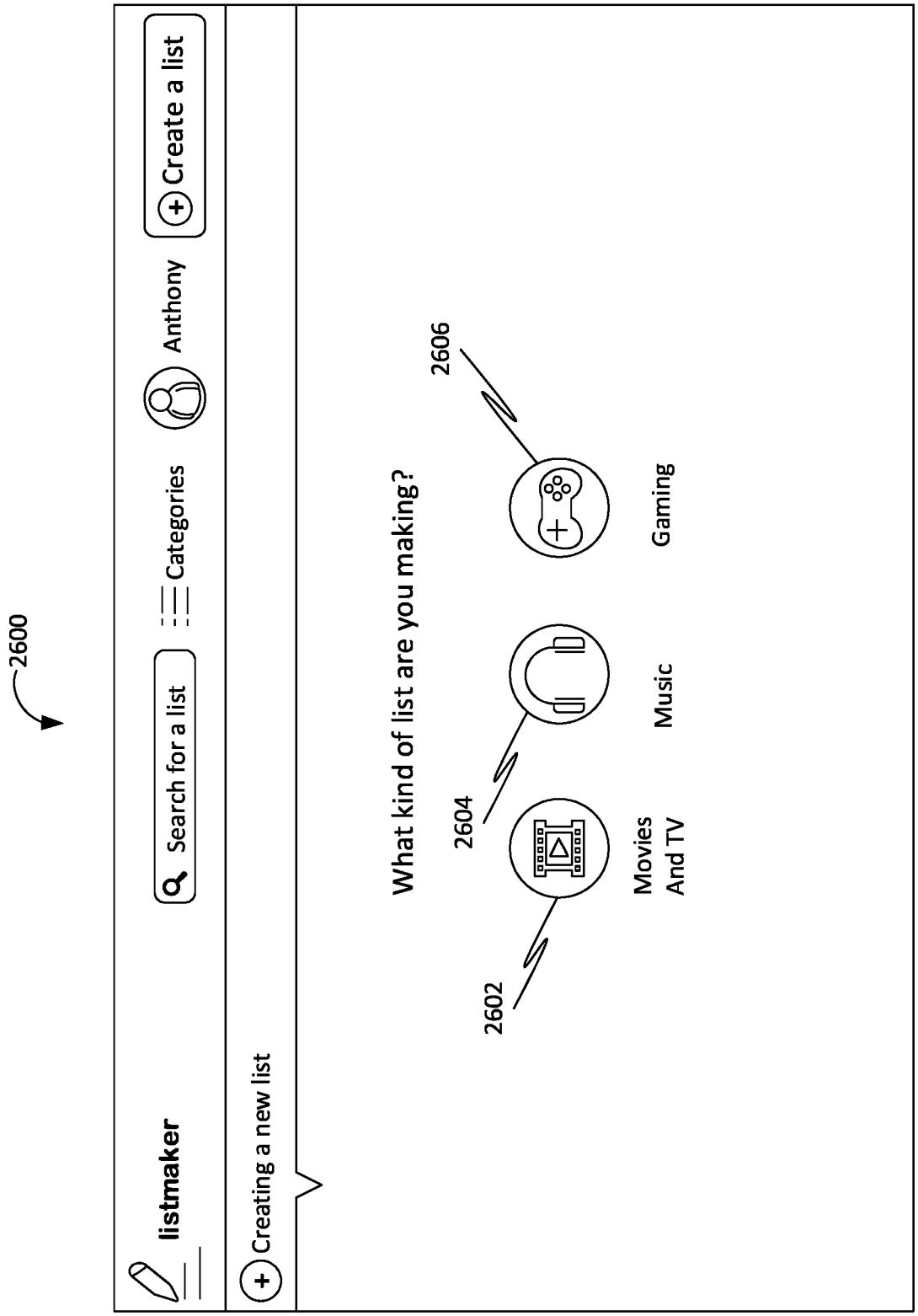
FIG. 26 is a user interface of the application for obtaining a category associated with the list, in accordance with some embodiments.
Figure 27:
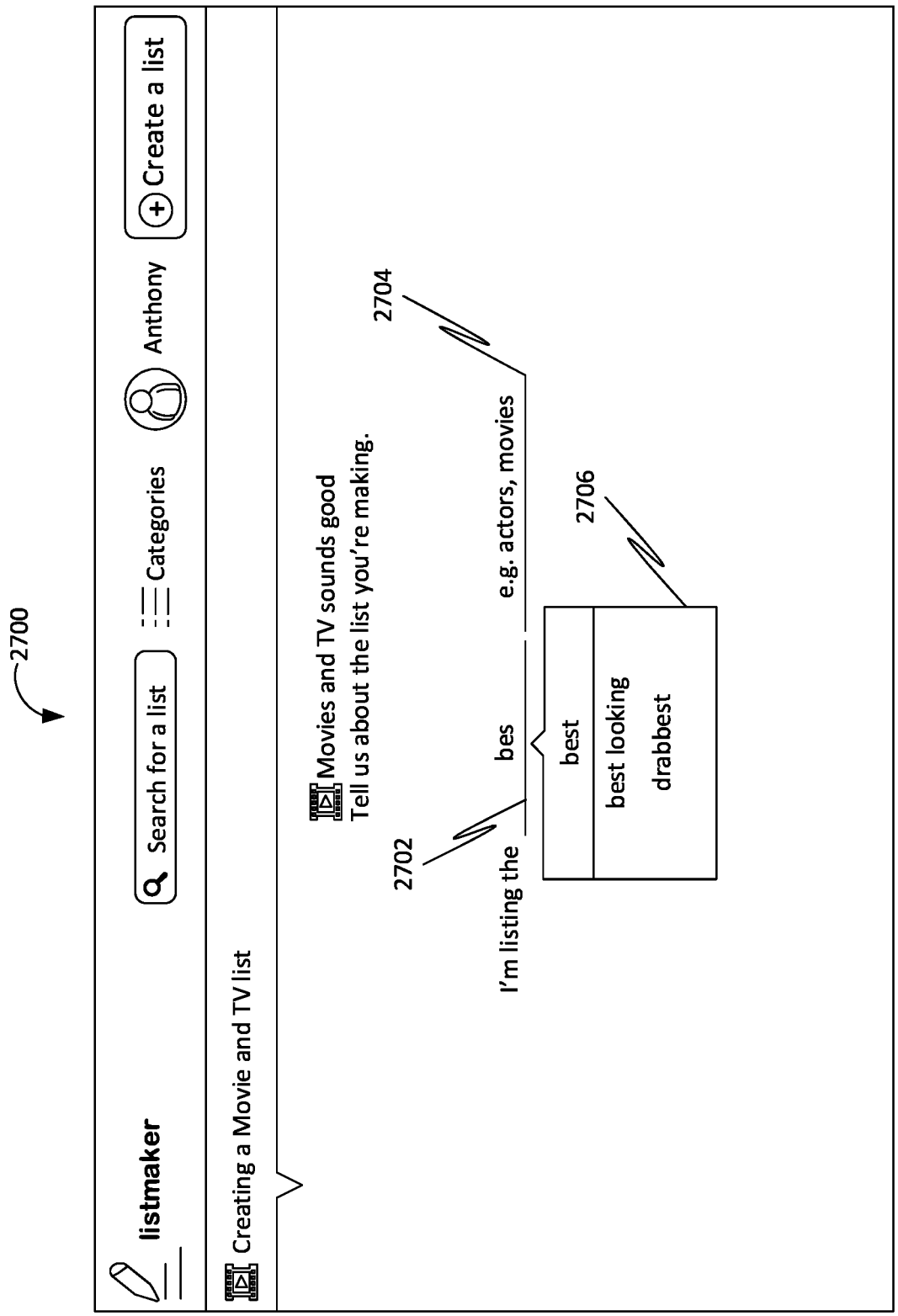
FIG. 27 is a user interface of the application for obtaining an adjective associated with the list title, in accordance with some embodiments.

FIG. 24 is a user interface 2400 of the application in accordance with some embodiments. A user may use a button 2402 to log on to the application. Once the user logs in, the application may display name 2502 of the logged user as shown on a user interface 2500 in FIG. 25. Further, the application may display updates 2504 related to new lists created by the user and other users. The user may use "create a list" button 2506 to initiate the process to create a new list. In response, the application may display a user interface 2600 shown in FIG. 26. The user interface 2600 allows the user to select a type of list the user wants to create. The user may select one of a "movies and TV" button 2602, a "music" button 2604 and a "gaming" button 2606 to indicate the type of list the user wants to create. If the user selects the "movies and TV" button 2602, then the application may display a user interface 2700 shown in FIG. 27. Then, the user may type an adjective in a text field 2702 and a subject in a text field 2704. As the user types in the text fields, the application may show a tool-tip 2706 providing hints to the user.

In an exemplary scenario, if the user wants to type the subject as "Horror Movies", then the user may start entering "movies", and an auto-populated list may provide suggestions to the user that contains items, such as, for example, horror movies, action movies, thriller movies, romantic movies, etc.

According to an exemplary embodiment, the application may display the number of users that have created the same list that the user is viewing. For example, if the user is viewing a list of "Best TV shows ever", then the application may display a number of users who have created the list associated the same list title, "Best TV shows ever". Further, the user may click on an option, for example, "Create your own version of this list", to create their own version of this list directly from the pre-generated title.

Figure 28:
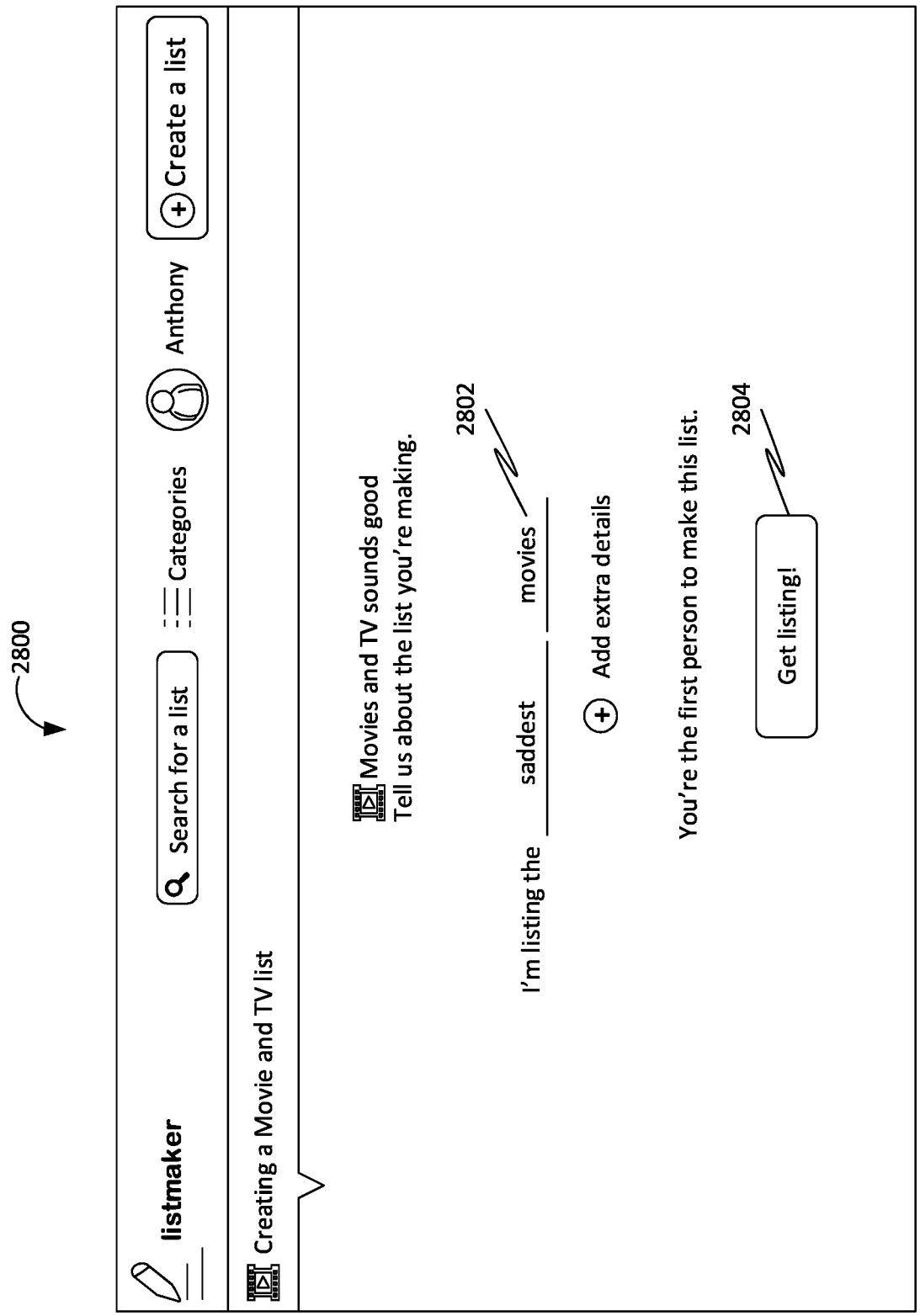
FIG. 28 is a user interface of the application for obtaining a subject associated with the list title, in accordance with some embodiments.
Figure 29:
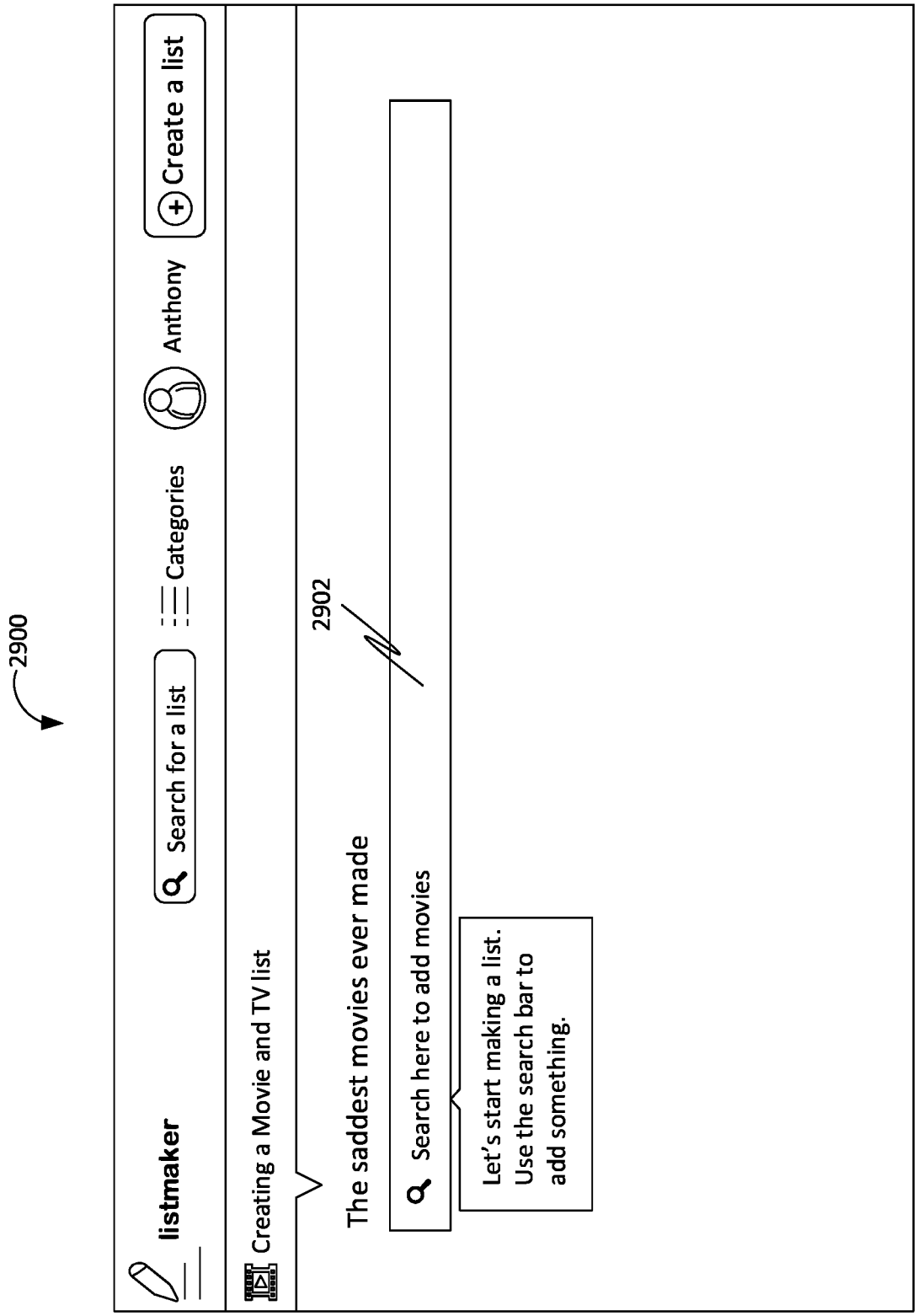
FIG. 29 is a user interface of the application for searching for list items, in accordance with some embodiments.
Figure 30:
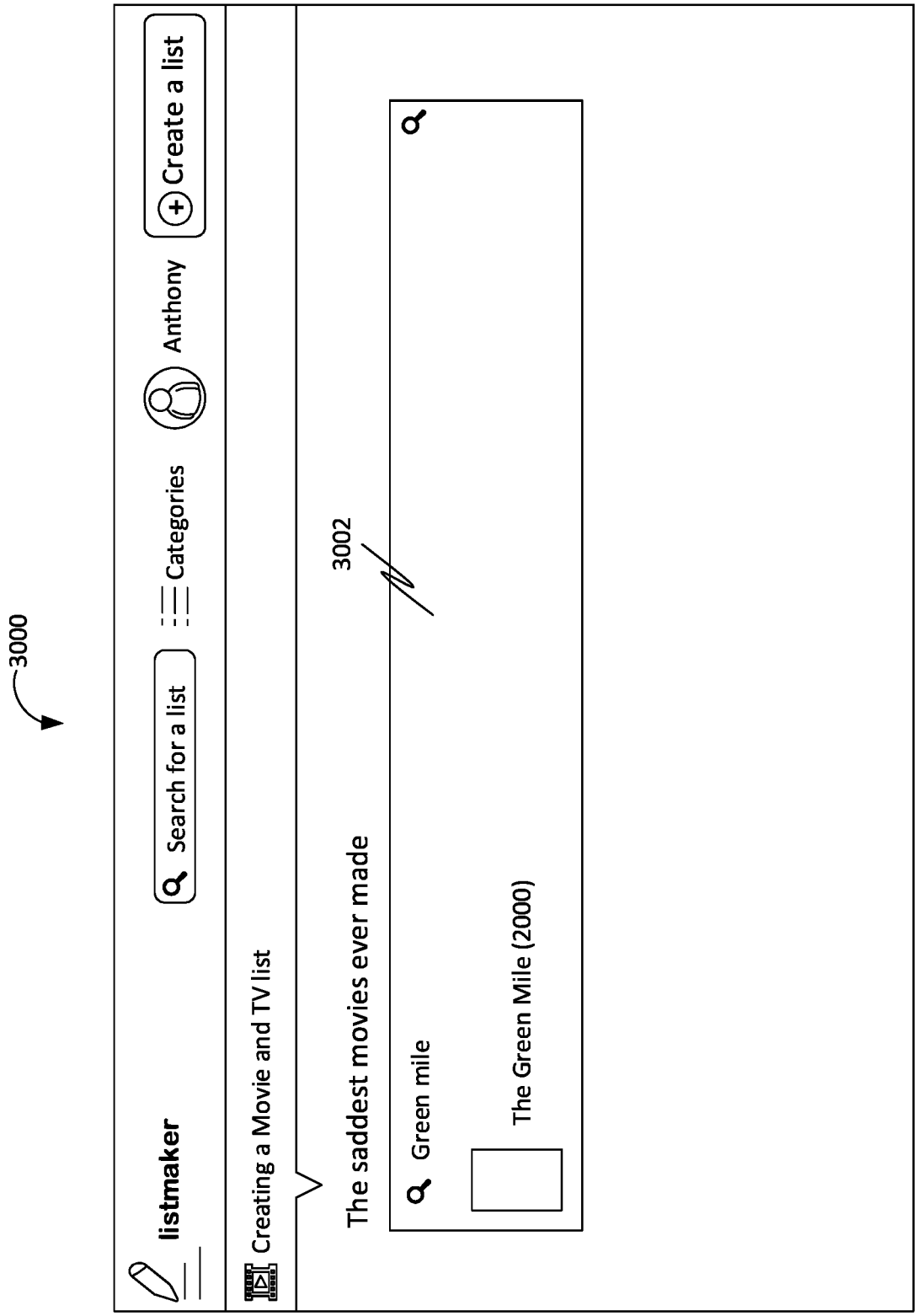
FIG. 30 is a user interface of the application for adding list items, in accordance with some embodiments.
Figure 31:
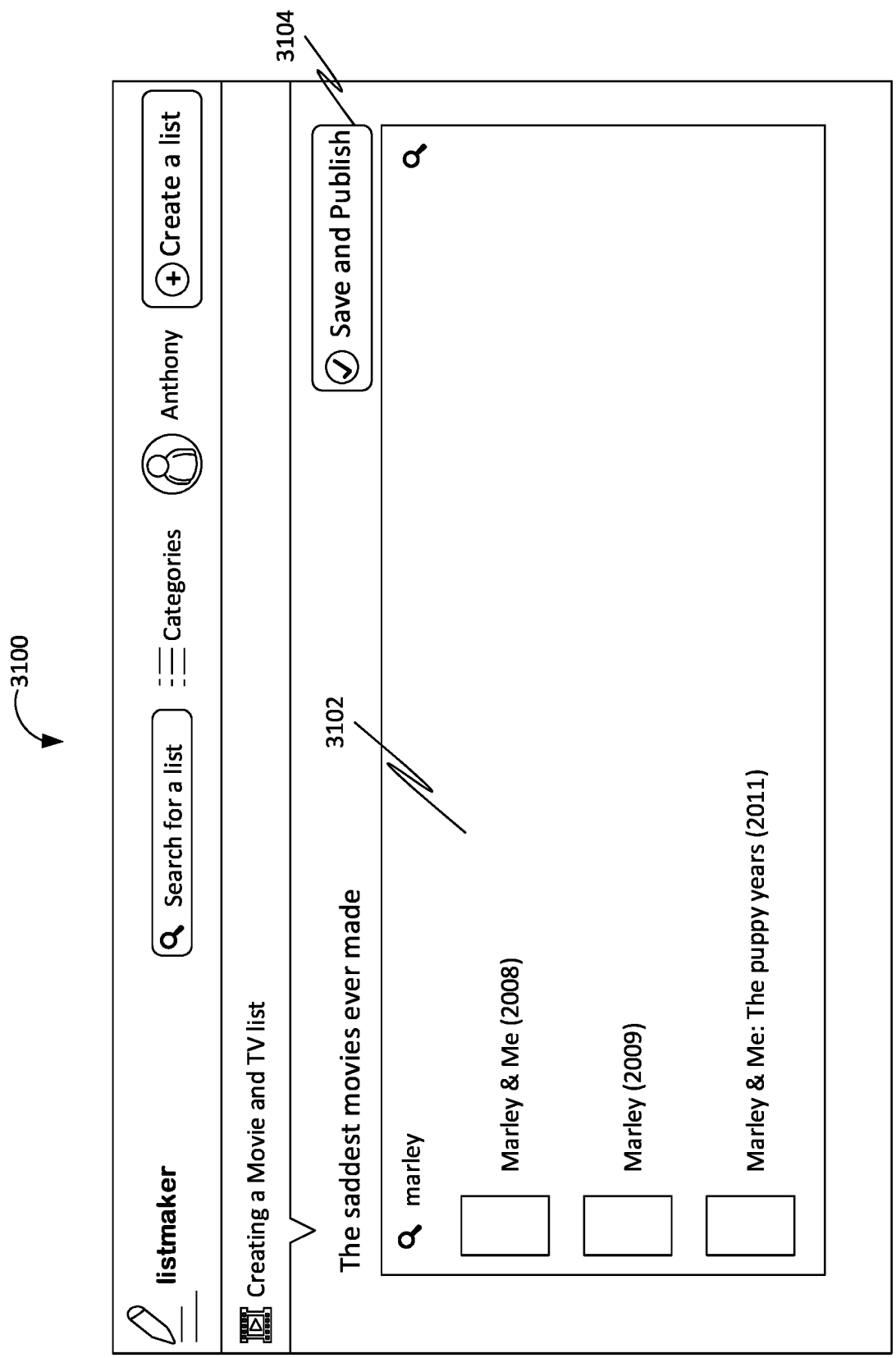
FIG. 31 is a user interface of the application for publishing a list, in accordance with some embodiments.

FIG. 28 is a user interface 2800 of the application in accordance with some embodiments. The user may indicate that a list title 2802 is "The saddest movies ever made". Further, the user may click a "get listing" button 2804 to add items to the list. In response, the application may display a user interface 2900 in FIG. 29. The user interface 2900 may include a search box 2902 that is connected to an API at the backend. For example, if the list mentions "Movies", the application may be connected to a database of movies through the API. Accordingly, the search box may let the user search for movies in a large database, such as, for example, moviesweb.com, through the API. Further, the user may enter the input search query in the search box 2902. For example, the user may search for movies that are associated with the list title "The saddest movies ever made". Accordingly, the search box 2902 may be connected to an API that is associated with a movies database that stores name and information related to movies.

Further, in an embodiment, a search query may be dynamically created once the contextual data is received. For instance, if the subject is entered as "movies", the search query for the saddest movies may be dynamically created. Thereafter, the application may search and provide results related to saddest movies associated with the input search query. Further, the user may select options presented by the application through the search box. For example, the user may select "Green Mile" which may be added to the list 3002 as shown in the user interface 3000 shown in FIG. 30. Further, the user may search for specific movies. For example, as shown in a user interface 3100 in FIG. 31, the user may search for movies with the word "Marley" in their title. The application may search and list 3102 the movies with the word "Marley" in their title. Thereafter, the user may click a "save and publish" button 3104 to publish the list. Accordingly, the application may display the published lists 3202 as shown in a user interface 3200 in FIG. 32.

According to an exemplary embodiment, the application may suggest a list title to the user based on the list items. For instance, if the user uploads a spreadsheet file which stores a list of games, then the application may accordingly analyze the list items mentioned in the spreadsheet file. Further, the application may suggest the list title that appropriately defines the core and/or commonality between the list items, such as, for example, games developed by EA sports.

According to some embodiments, the subject_ID may be linked to a data source for the list items. For example, "movies" will search a data source API for a list of movies based on what the user has searched. Further, if a list sentence includes an applied filter, the API call to the data source will also include the relevant filter information.

According to an exemplary embodiment, when a list is created for the first time, a master list and user list may be created. The user list may refer to a user's version of the master list. Further, the master list may store the subject ID, the adjective ID and filter IDs of the list title. Furthermore, when a list is created for a second time, another user list is made. In an instance, each user may only create the same list once. In an instance, the application may allow a user to view everybody's list, the user's own version of the list, and versions of lists created by followed users. According to some embodiments, order ranking for the master list items may be based on a score of a particular list item. Accordingly, the score of the particular list item may be based on various factors, such as, for example, the number of user lists it is referenced on with the same list title, the position of the list item on each user list it is referenced, the number of list items on each user list, and the date on which the list item became available for listing. In an instance, as the number of the list items on a particular list grows, the score of each list item on that list may grow. Further, there may be an exponential decline in the score increase as the number of the list items in a list grows. Further, the scores may be divided by the amount of time that the list item has been available. For example, if a movie has been released recently, the movie may still have an equal chance to reach the top spot of a list as that of a movie that has been available since the application was launched.

According to an exemplary embodiment, the user may be may be able to view the rank of each list item in the master list. In an instance, if the user is viewing a master list for the "Best Movies ever made", then the user may be able to view the rank of a particular list item. For example, if the master list corresponding to "Best movies ever made" includes "Pulp Fiction" as the list item, then the application may also present the rank corresponding to the list item "Pulp Fiction" in all the lists created by the user.

Further, in an embodiment, whenever a user follows another user, the user may be able to view a selection of lists created by a followed user.

Figure 33:
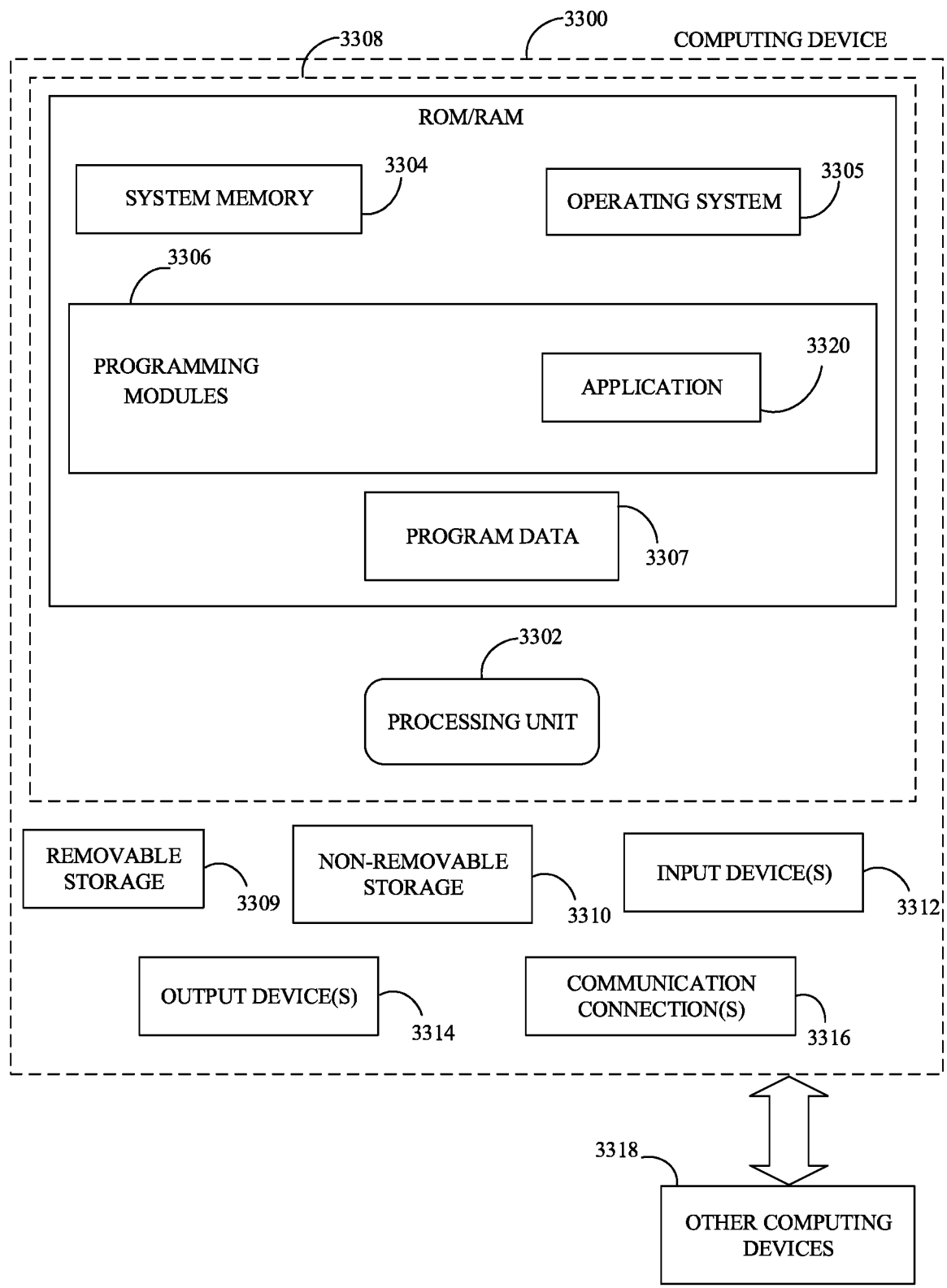
FIG. 33 is a block diagram of a computing device for implementing the methods disclosed herein, in accordance with some embodiments.

With reference to FIG. 33, a system consistent with an embodiment of the disclosure may include a computing device or cloud service, such as computing device 3300. In a basic configuration, computing device 3300 may include at least one processing unit 3302 and a system memory 3304. Depending on the configuration and type of computing device, system memory 3304 may comprise, but is not limited to, volatile (e.g. random-access memory (RAM)), non-volatile (e.g. read-only memory (ROM)), flash memory, or any combination. System memory 3304 may include operating system 3305, one or more programming modules 3306, and may include a program data 3307. Operating system 3305, for example, may be suitable for controlling computing device 3300's operation. In one embodiment, programming modules 3306 may include a machine learning module. Furthermore, embodiments of the disclosure may be practiced in conjunction with a graphics library, other operating systems, or any other application program and is not limited to any particular application or system. This basic configuration is illustrated in FIG. 33 by those components within a dashed line 3308.

Computing device 3300 may have additional features or functionality. For example, computing device 3300 may also include additional data storage devices (removable and/or non-removable) such as, for example, magnetic disks, optical disks, or tape. Such additional storage is illustrated in FIG. 33 by a removable storage 3309 and a non-removable storage 3310. Computer storage media may include volatile and nonvolatile, removable and non-removable media implemented in any method or technology for storage of information, such as computer-readable instructions, data structures, program modules, or other data. System memory 3304, removable storage 3309, and non-removable storage 3310 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 3300. Any such computer storage media may be part of device 3300. Computing device 3300 may also have input device(s) 3312 such as a keyboard, a mouse, a pen, a sound input device, a touch input device, a location sensor, a camera, a biometric sensor, etc. Output device(s) 3314 such as a display, speakers, a printer, etc. may also be included. The aforementioned devices are examples and others may be used.

Computing device 3300 may also contain a communication connection 3316 that may allow device 3300 to communicate with other computing devices 3318, such as over a network in a distributed computing environment, for example, an intranet or the Internet. Communication connection 3316 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 3304, including operating system 3305. While executing on processing unit 3302, programming modules 3306 (e.g., application 3320 such as a media player) may perform processes including, for example, one or more stages of methods 300-900, algorithms, systems, applications, servers, databases as described above. The aforementioned process is an example, and processing unit 3302 may perform other processes. Other programming modules that may be used in accordance with embodiments of the present disclosure may include machine learning application etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the invention has been explained in relation to its preferred embodiment, it is to be understood that many other possible modifications and variations can be made without departing from the spirit and scope of the invention.

What is claimed is:

1. A method of facilitating management of lists comprising:
   providing a communication device, a processing device and a storage device;
   transmitting, using the communication device, an interface to a user device, wherein the interface comprises a single free-form text field;
   receiving, using the communication device, a plurality of contexts from the user device through the single free-form text field by
      prompting a user to provide a plurality of free-form contexts through the single free-form text field,
      receiving the plurality of free-form contexts through the single free-form text field,
   analyzing, using the processing device, the plurality of free-form contexts by
      matching the plurality of free-form contexts to a plurality of predetermined terms and
      suggesting, using the processing device, an additional plurality of contexts in accordance with the plurality of predetermined terms based on the analyzing the plurality of free-form contexts,
      wherein the single free-form text field corresponds to at least one of an adjective and a subject and a filter,
      wherein the additional plurality of contexts are correspondingly associated with at least one of an adjective identifier, a subject identifier, and a filter identifier;
   generating, using the processing device, a list title based on the at least one of the adjective identifier and the subject identifier and the filter identifier;
   storing, using the storage device, the list title in association with a user identifier associated with the user device and an indication of a list of items associated with the list title;
   transmitting, using the communication device, the list title to the user device;
   retrieving, using the storage device, a plurality of list titles of a plurality of user-generated lists from a plurality of user devices;
   analyzing, using the processing device, the plurality of list titles of the plurality of user-generated lists by finding common items in the plurality of list titles;
   generating, using the processing device, a master list based on the analyzing the plurality of list titles,
   wherein the master list comprises a plurality of master list items,
   wherein the plurality of master list items are ranked based on an order of a plurality of list items in the plurality of user-generated lists,
   wherein the order is based on scores of the plurality of list items,
   wherein the score of each of the plurality of list items is based on a plurality of factors including a number of the plurality of user-generated lists referenced on with a same list title, a position of each of the plurality of list items on each of the plurality of user-generated lists, a number of the plurality of list items on each of the plurality of user-generated lists, and a date on which each of the plurality of list items becomes available for listing;
   storing, using the storage device, a master list identifier associated with the master list; and
   transmitting, using the communication device, the master list to the user device.

2. The method of claim 1 further comprising:
   receiving, using the communication device, a query comprising at least one of the subject identifier and the adjective identifier and the filter identifier from the user device;
   retrieving, using the storage device, at least one list title based on the query, wherein the at least one list title comprises the list title; and
   transmitting, using the communication device, the at least one list title to the user device.

3. A system for facilitating management of lists comprising: a communication device; a processing device; a storage device; and the system being configured for:
   transmitting, using the communication device, an interface to a user device, wherein the interface comprises a single free-form text field;
   receiving, using the communication device, a plurality of contexts from the user device through the single free-form text field by
      prompting a user to provide a plurality of free-form contexts through the single free-form text field,
      analyzing, using the processing device, the plurality of free-form contexts by
      matching the plurality of free-form contexts to a plurality of predetermined terms and
      suggesting, using the processing device, the plurality of contexts in accordance with the plurality of predetermined terms based on the analyzing the plurality of free-form contexts,
      wherein the single free-form text field corresponds to at least one of an adjective and a subject and a filter,
      wherein the plurality of contexts are correspondingly associated with at least one of an adjective identifier, a subject identifier, and a filter identifier;
   generating, using the processing device, a list title based on the at least one of the adjective identifier and the subject identifier and the filter identifier;
   storing, using the storage device, the list title in association with a user identifier associated with the user device and an indication of a list of items associated with the list title;
   transmitting, using the communication device, the list title to the user device;
   retrieving, using the storage device, a plurality of list titles of a plurality of user-generated lists from a plurality of user devices;
   analyzing, using the processing device, the plurality of list titles of the plurality of user-generated lists by finding common items in the plurality of list titles;
   generating, using the processing device, a master list based on the analyzing,
   wherein the master list comprises a plurality of master list items,
   wherein the plurality of master list items are ranked based on an order of a plurality of list items in the plurality of user-generated lists,
   wherein the order is based on scores of the plurality of list items,
   wherein the score of each of the plurality of list items is based on a plurality of factors including a number of the plurality of user-generated lists referenced on with a same list title, a position of each of the plurality of list items on each of the plurality of user-generated lists, a number of the plurality of list items on each of the plurality of user-generated lists, and a date on which each of the plurality of list items becomes available for listing;

storing, using the storage device, a master list identifier associated with the master list; and transmitting, using the communication device, the master list to the user device.

4. The system of claim 3, wherein the system is further configured for:

receiving, using the communication device, a query comprising at least one of the subject identifier and the adjective identifier and the filter identifier from the user device;

retrieving, using the storage device, at least one list title based on the query, wherein the at least one list title comprises the list title; and transmitting, using the communication device, the at least one list title to the user device.

\* \* \* \* \*